(12) United States Patent
Smith et al.

(10) Patent No.: US 6,974,176 B2
(45) Date of Patent: Dec. 13, 2005

(54) CONTAINER COVERING APPARATUS

(75) Inventors: Fred P. Smith, Alpine, UT (US); Omer Akdag, Stuart, FL (US)

(73) Assignee: John Donovan Enterprises, Inc., Stuart, FL (US)

( * ) Notice: Subject to any disclaimer, the term of this patent is extended or adjusted under 35 U.S.C. 154(b) by 0 days.

(21) Appl. No.: 11/037,472

(22) Filed: Jan. 19, 2005

(65) Prior Publication Data

US 2005/0173940 A1    Aug. 11, 2005

Related U.S. Application Data

(63) Continuation-in-part of application No. 10/847,842, filed on May 17, 2004, and a continuation of application No. 10/259,105, filed on Sep. 24, 2002, now Pat. No. 6,742,828.

(51) Int. Cl.[7] ............................................. B60J 11/00
(52) U.S. Cl. .................................. 296/98; 396/100.14
(58) Field of Search ............................ 296/98, 100.14, 296/100.15, 100.16

(56) References Cited

U.S. PATENT DOCUMENTS

| | | |
|---|---|---|
| 2,591,186 A | 4/1952 | Neitzke |
| 2,594,910 A | 4/1952 | Germann |
| 3,467,431 A | 9/1969 | Turcotte |
| 3,498,666 A | 3/1970 | Harrawood |
| 3,515,428 A | 6/1970 | Killion |
| 3,549,197 A | 12/1970 | Sibley |
| 3,549,199 A * | 12/1970 | Sibley .......................... 296/98 |
| 3,628,826 A * | 12/1971 | Sibnley ........................ 296/98 |
| 3,759,568 A | 9/1973 | Unruh |
| 3,774,958 A | 11/1973 | Thorpe |
| 3,841,697 A * | 10/1974 | McFarland ............. 296/100.14 |
| 3,854,770 A | 12/1974 | Grise et al. |
| 3,868,142 A | 2/1975 | Bachand et al. |
| 3,977,719 A | 8/1976 | Thurston |
| 4,023,857 A | 5/1977 | Killion |
| 4,030,760 A * | 6/1977 | Danowski .................... 273/353 |
| 4,030,780 A | 6/1977 | Petretti |
| 4,046,416 A | 9/1977 | Penner |
| 4,050,734 A | 9/1977 | Richard |
| 4,082,347 A | 4/1978 | Petretti |
| 4,126,351 A | 11/1978 | Peteretti |
| 4,341,416 A | 7/1982 | Richard |
| 4,516,802 A | 5/1985 | Compton |
| 4,529,098 A | 7/1985 | Heider et al. |
| 4,673,208 A * | 6/1987 | Tsukamoto ................... 296/98 |

(Continued)

FOREIGN PATENT DOCUMENTS

FR    2752787    3/1998

*Primary Examiner*—Kiran B. Patel
(74) *Attorney, Agent, or Firm*—Banner & Witcoff, Ltd.

(57) ABSTRACT

An apparatus for covering an open container of a vehicle includes a pair of arm assemblies. Each arm assembly has a first arm, a second arm, and a linking assembly coupling the first and second rotatable members to one another. A first actuator is attached to the first arm, and a cover is connected to the second arm. The first arm is driven by the first actuator, which causes the linking assembly to passively drive the second arm and to thereby to substantially vertically raise the cover. The apparatus may include a second actuator for rotating the second arm relative to the first arm for moving the cover across an open top of the open container. A method is also provided for covering an open top container supported by a vehicle.

20 Claims, 18 Drawing Sheets

U.S. PATENT DOCUMENTS

| | | | | |
|---|---|---|---|---|
| 4,842,323 | A | 6/1989 | Trickett | |
| 4,874,196 | A * | 10/1989 | Goldstein et al. | 296/98 |
| 4,893,864 | A | 1/1990 | Bailey | |
| 4,909,563 | A | 3/1990 | Smith | |
| 4,981,317 | A | 1/1991 | Acosta | |
| 5,054,840 | A | 10/1991 | Wilhite | |
| 5,058,956 | A | 10/1991 | Godwin, Sr. | |
| 5,125,713 | A | 6/1992 | Willingham et al. | |
| 5,180,203 | A | 1/1993 | Goudy | |
| 5,218,743 | A | 6/1993 | Miller | |
| 5,238,287 | A | 8/1993 | Haddad, Jr. | |
| 5,240,303 | A | 8/1993 | Hageman | |
| 5,292,169 | A * | 3/1994 | O'Brian | 296/98 |
| 5,328,228 | A | 7/1994 | Klassen | |
| 5,337,818 | A | 8/1994 | Coad | |
| 5,340,187 | A | 8/1994 | Haddad, Jr. | |
| 5,354,113 | A | 10/1994 | Pettersson | |
| 5,380,058 | A | 1/1995 | Short et al. | |
| 5,388,882 | A * | 2/1995 | Russell et al. | 296/98 |
| 5,482,347 | A | 1/1996 | Clarys et al. | |
| 5,547,243 | A | 8/1996 | Lamb et al. | |
| 5,549,347 | A | 8/1996 | Anderson | |
| 5,573,295 | A | 11/1996 | Haddad, Jr. | |
| 5,697,663 | A | 12/1997 | Chenowth | |
| 5,743,700 | A | 4/1998 | Wood, Jr. et al. | |
| 5,752,735 | A | 5/1998 | Fleming et al. | |
| 5,762,002 | A | 6/1998 | Dahlin et al. | |
| 5,765,901 | A | 6/1998 | Wilkens | |
| 5,803,528 | A | 9/1998 | Haddad, Jr. | |
| 5,823,604 | A | 10/1998 | Chenowth | |
| 5,829,818 | A * | 11/1998 | O'Daniel | 296/98 |
| 5,829,819 | A | 11/1998 | Searfoss | |
| RE36,135 | E | 3/1999 | O'Brian | |
| 5,882,062 | A | 3/1999 | Chenowth | |
| 5,887,937 | A | 3/1999 | Searfoss | |
| 5,924,758 | A | 7/1999 | Dimmer et al. | |
| 5,944,374 | A | 8/1999 | Searfoss | |
| 5,988,732 | A | 11/1999 | Schouten | |
| 6,053,556 | A | 4/2000 | Webb | |
| 6,089,645 | A | 7/2000 | Haddad, Jr. | |
| 6,109,680 | A | 8/2000 | Horner et al. | |
| 6,142,553 | A | 11/2000 | Bodecker | |
| 6,199,935 | B1 | 3/2001 | Waltz et al. | |
| 6,206,448 | B1 | 3/2001 | Haddad, Jr. | |
| 6,220,646 | B1 | 4/2001 | Merino Lamela | |
| 6,237,985 | B1 * | 5/2001 | O'Brian | 296/98 |
| 6,250,709 | B1 | 6/2001 | Haddad, Jr. | |
| 6,273,490 | B1 | 8/2001 | Haddad, Jr. | |
| 6,338,521 | B1 | 1/2002 | Henning | |
| 6,618,790 | B1 | 9/2003 | Talreja et al. | |
| 6,659,531 | B2 * | 12/2003 | Searfoss | 296/98 |
| 6,695,382 | B2 * | 2/2004 | Ciferri et al. | 296/98 |
| 2003/0193208 | A1 * | 10/2003 | Ciferri et al. | 296/98 |

* cited by examiner

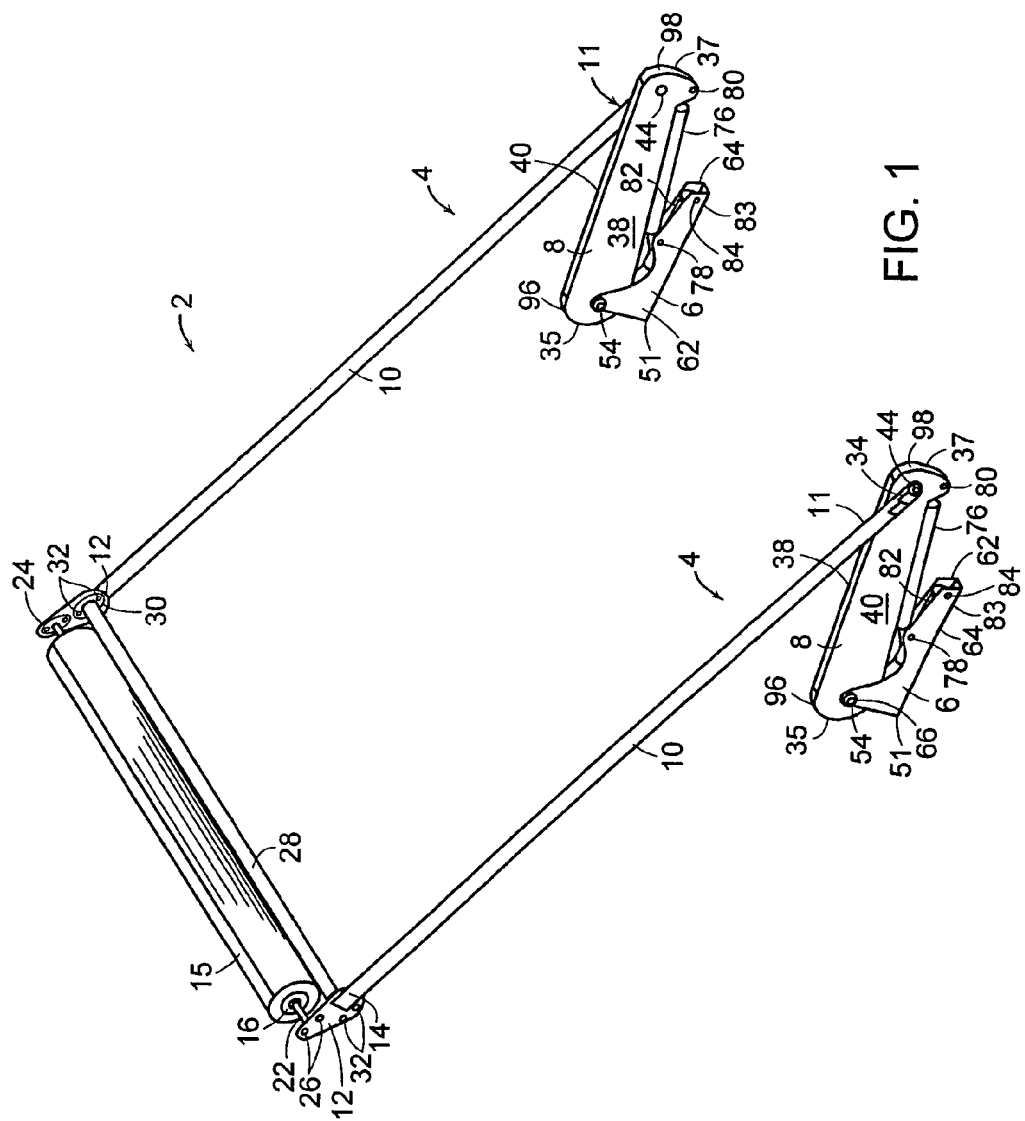

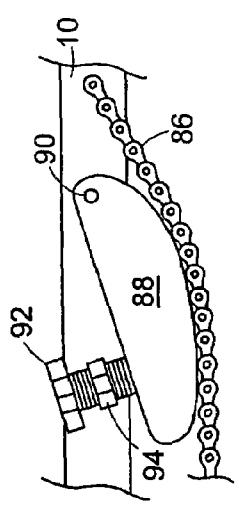
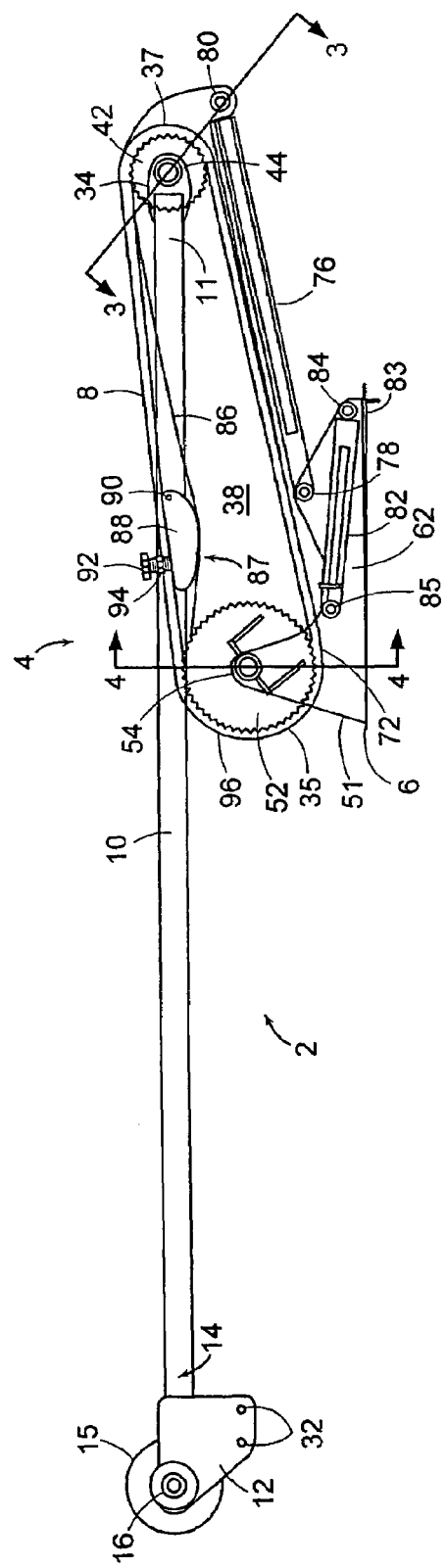

CONTAINER COVERING APPARATUS

CROSS-REFERENCE TO RELATED APPLICATIONS

This application is a continuation in part of co-pending U.S. patent application Ser. No. 10/847,842 filed May 17, 2004 entitled "Container Covering Apparatus", which is a continuation of U.S. application Ser. No. 10/259,105 filed Sep. 24, 2002, now U.S. Pat. No. 6,742,828 issued Jun. 1, 2004 entitled "Container Covering Apparatus." The contents of the above-noted applications are each expressly incorporated herein by reference.

FIELD OF THE INVENTION

This invention relates to an apparatus for covering open containers, and, more particularly, to an apparatus for covering open top truck containers.

BACKGROUND OF THE INVENTION

Large open top containers are commonly used to transport loose materials such as construction debris or refuse to landfills or other dumping locations. These containers are often transported on a roll-off truck that has the capability to pick up and off-load the container at desired locations. The tops of such containers are typically open to facilitate loading. In many places, laws and regulations require the tops of such containers to be covered before they can be transported on public roadways so that material from the container cannot be blown out of the containers. Even where there are no laws regarding covering a load, it is beneficial for the driver to cover the load in order to reduce the possibility of damage to other property from rocks or other debris that might escape from the container. These containers typically have a rectangular top opening. The size of these containers may vary, with many containers ranging from 16 to 24 feet in length and 4 to 8 feet in height. It is common for any one roll-off truck to carry a number of different sizes of these containers.

Placing a tarp or cover on a container manually is both time-consuming and expensive. The need for a covering apparatus to accommodate various container sizes that would automatically deploy the cover or at least simplify and speed up the covering process became apparent some time ago.

Several systems have been proposed to address the need to cover open top containers during transport. One approach has been to provide a spring-loaded spool, mounted to the front of the truck, that moves up and down on a pedestal to suit the height of the container. The driver can then pull the cover off of the spool out over the container opening like one would pull a window shade. Although this semi-automatic covering method is better than manual covering, it is still difficult and time consuming, and requires the driver to fasten the end of the cover that was pulled off of the spool to the container. Many of the prior art devices that automate the covering process are similar to the semi-automated process described above, but have a pivoting arm secured to the truck or truck body on each side of the container. These arms pull the end of the cover over the container. Sometimes these arms are spring-loaded to pull the cover toward the rear of the container as the cover is unrolled from the motor-controlled roller at the front of the container. Sometimes the roller at the front of the container is spring-loaded to roll the cover up on it, and the arms are controlled by a hydraulic cylinder or other suitable mechanism to pull the cover over the container. Further, some of the prior art devices have a spring-loaded roller with the cover rolled onto it and attached to the arms, with the other end of the cover attached to the truck just behind the cab. As the arms pivot, the spool of material is pulled from front to back over the top of the container, thereby unspooling the material so that it lies over the open top, effectively covering the container.

One of the greatest challenges in the covering mechanisms is to provide the ability to adapt to various container lengths and heights. One approach to these challenges is to provide for a telescopic arm pivotally attached to either the container itself or the truck that transports the container, such as disclosed in U.S. Pat. No. 4,874,196 to Goldstein et al. and U.S. Pat. No. 5,803,528 to Haddad, Jr. However, the use of telescopic arms tends to be generally more expensive to fabricate and more difficult to maintain than employing arms in a pivoting motion in especially harsh environments to which these covering systems are commonly.

A second approach to accommodating the various container sizes has been to provide an arm composed of two pivotally connected sections such as disclosed in U.S. Pat. No. 5,292,169 to O'Brian. However, when hauling a container that has a is shorter length, this type of covering mechanism may require the end of the arm that supports the spool of covering material to hang over the back of the container when the cover is applied. As a result, the end of the arm is unsupported during transport of the container, and all of the shock loads or dynamic loads that occur are applied directly to the base of the arm. Further, this could put large loads on the cover itself, potentially causing premature failure. These loads could be significant and could require over design of the base structure, with its accorded additional weight, and/or a reduced operating life of the mechanism. Further, the end of the arm is exposed to potential damage because it is the rearmost point on the truck when the cover is applied.

Another disadvantage of both the sliding and pivoting types is that two separate motions control the roller position, the rotation of the base arm and either the extension or rotation of the outer arm. This is a substantial problem if the rolled up cover is stored between the truck cab and the container. To deploy the cover, the roller must initially move in a substantially vertical line from its stored position in between the cab of the truck and the top of the front wall of the container as the container is being covered. Often the space in between the cab and the container is small and any deviation from the vertical path may result in damage to the covering mechanism, the cab of the truck, or the container. One partial solution to this problem has been to mount the stored spool of covering material at or above the top of the cab of the truck. However, this mounting position necessitates a tall support structure for the spool of covering material that at least partially obstructs the view through the back window of the cab. Additionally, a tall support structure potentially prevents adequate coverage of the front edge of the container when the containers have a shorter height.

A further disadvantage of the pivoting type of the prior art is that in covering short containers, with the roller placed on the rearmost top edge of the container, the base arm would stick up considerably above the top of the container, increasing the possibility of damage to the covering apparatus from tree limbs as the container is being transported.

A further disadvantage of the prior art is that, in the stowed position, at least portions of the arms are substantially above the bottom of the container. Thus, as the container is rolled on and off the vehicle, components of the container, such as hinges and latches, which are typically positioned at the maximum width of the container, are more likely to hit and damage the covering mechanism.

Another problem with manual covering of a container, and with certain semi-automatic covering systems is the risk of injury. When items in a container project upward beyond the top of the container, the operator may need to climb up on the container and/or load to cover the container, or ensure that the covering is able to extend over the items projecting upward out of the container. The risk lies not only in climbing up high off the ground, but also in the parts of the load that could cut or injure the operator. Also, in some prior art container covering systems, it is difficult for the cover to get over such projecting loads, particularly the types of container covering systems that extend linearly over the container.

SUMMARY OF THE INVENTION

The principles of the present invention may be used advantageously to provide a container covering apparatus that can be adapted to cover containers of various sizes, is simple to operate and is reliable.

In accordance with a first aspect of the invention, an apparatus for covering an open container of a vehicle includes a cover movable between an extended position in which the cover overlies the container and a stowed position in which the container is open, and an arm assembly coupled to the cover to move the cover between the extended and stowed positions. The arm assembly includes a first arm and a second arm movably coupled together, in which the first arm is adapted for attachment to a vehicle and the second arm is attached to the cover. The apparatus further includes a first actuator coupled to the first arm for moving the first arm relative to the vehicle, and a linking assembly coupled to the first and second arms to passively move the second arm when the first arm is moved by the actuator.

In accordance with another aspect, a method for covering an open top container supported by a vehicle includes the steps of providing a cover attached to a pivoted arm structure, actuating a first actuator to drive a first arm of the pivoted arm structure, driving a second arm of the pivoted arm structure via movement of the first arm, and raising the cover substantially vertically from a stowed position to a covering position.

These and additional features and advantages of the invention disclosed here will be further understood from the following detailed disclosure of certain embodiments.

BRIEF DESCRIPTION OF THE DRAWINGS

FIG. 1 is a perspective view of a preferred embodiment of a covering apparatus in accordance with the present invention.

FIG. 2 is a side elevation of the covering apparatus of FIG. 1, shown with one wall of the support member and one wall of the first arm member removed.

FIG. 11 is a side elevation of the tensioning device of FIG. 2.

Figure 3:
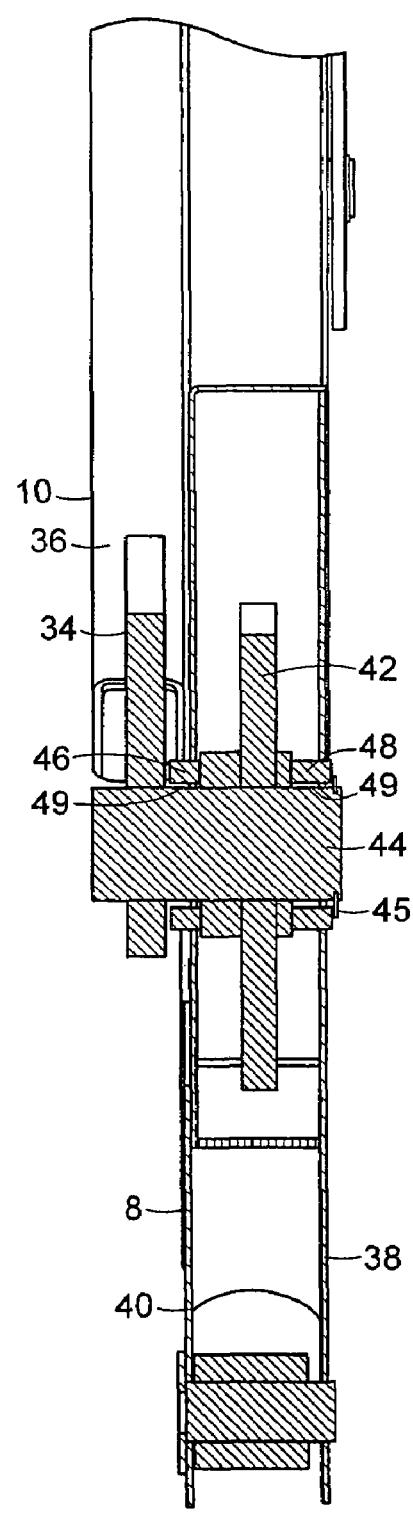
FIG. 3 is a section view of the covering apparatus of FIG. 1, taken along line 3—3 of FIG. 2.

The figures referred to above are not drawn necessarily to scale and should be understood to present a representation of the invention, illustrative of the principles involved. Some features of the container covering apparatus depicted in the drawings have been enlarged or distorted relative to others to facilitate explanation and understanding. The same reference numbers are used in the drawings for similar or identical components and features shown in various alternative embodiments. A container covering apparatus as disclosed herein, will have configurations and components determined, in part, by the intended application and environment in which it is used.

DETAILED DESCRIPTION OF CERTAIN EMBODIMENTS

A preferred embodiment of a container covering apparatus 2 for a truck 3, or other vehicle, in accordance with the present invention is shown in FIGS. 1–2. The embodiments described herein show a roll-off container on a truck, however, it is to be appreciated that the use of the container covering apparatus of the present invention to cover other types of open containers on trucks, e.g., dump trucks, is considered to be within the scope of the invention. Covering apparatus 2 has a pair of jointed arms 4 separated by a preselected lateral distance. Arms 4 are preferably separated by a distance sufficient to clear a container on truck 3 as arms 4 move along their path of travel. Each arm 4 may include a support member such as a mounting bracket 6, a first arm member 8, and a second arm member 10. In certain preferred embodiments, covering apparatus 2 may not have a support member such as mounting bracket 6, and in such an embodiment, covering apparatus 2 would be secured directly to truck 3. In a preferred embodiment, second arm member 10 is longer than first arm member 8. In certain preferred embodiments, the length of first arm member 8 and second arm member 10 can be varied in order to accommodate containers of different lengths.

In certain preferred embodiments, second arm member 10 is a tubular member, although it is to be appreciated that other configurations of second arm member 10 are considered to be within the scope of the invention. Second arm member 10 has a first end 11 and a second end 14. A plate 12 is secured at second end 14 of each second arm member 10. A cover 15 is wound about a spool 16, each end of which is pivotally secured to a corresponding plate 12. In certain preferred embodiments, a rod 22 extends through spool 16, with a plate 24 secured at each end of rod 22. Plates 24 may be secured by bolts 26, or other suitable fasteners to plate 12.

In certain preferred embodiments, spool 16 could be rotatably secured to truck 3, with cover 15 being pulled from spool 16 as it is deployed over a container on the truck, similar to the action of a window shade being pulled into its deployed condition.

In preferred embodiments, cover 15 is formed of a flexible material such as polyester, polypropylene, vinyl, canvas, or other material suitable for retaining material within a container. Other suitable materials for cover 15 will become readily apparent to those skilled in the art, given the benefit of this disclosure. Spool 16 is preferably spring loaded such that cover 15 is kept in tension. The manner of spring loading a spool is well known in the art and need not be described here in detail.

In certain preferred embodiments, a rigid member such as a rod 28 extends between plates 12. Plates 30 at respective ends of rod 28 are secured to plates 12 by bolts 32 or other suitable fasteners. Rod 28 helps keep both second arm members 10 in synchronization as they travel, and also restrains undesirable side-to-side motion of second arm members 10. In certain embodiments, the synchronization is all done hydraulically, as will be described later. In such an embodiment, a large center tube, supporting spool 16, is used to provide side-to-side rigidity, and, therefore, rod 28 would not be needed. In certain preferred embodiments, both spool 16 and rod 28 can advantageously be disassembled from plates 16 and extension sections 10, respectively, for shipping.

A plate 34 may be secured to first end 11 of each second arm member 10. As can be seen in FIGS. 2 & 3, each first arm member 8 has a first end 35 and a second end 37, and may be formed of an inner wall 38 and an outer wall 40. Second end 37 of first member 6 is pivotally secured to first end 11 of second arm member 10 by a pin 44. First and second rotatable members, such as disks or sprockets 52, 42 are positioned between walls 38 and 40. Second sprocket 42 is pivotally secured to second end 37 of first arm member 8 by pin 44 that extends through and is keyed to second sprocket 42. Second sprocket 42 is rigidly secured to plate 34. A retaining ring 45 holds pin 44 axially on first arm member 8. Second sprocket 42 is seated between an outer bushing 46 and an inner bushing 48, which are secured to outer wall 40 and inner wall 38, respectively, by welding or other suitable means. Bearings 49 may also be contained within inner bushing 48 and outer bushing 46 to reduce fiction and wear. Thus, it can be seen that first arm member 8 will rotate in a plane laterally offset from a plane of rotation of second arm member 10.

Figure 4:
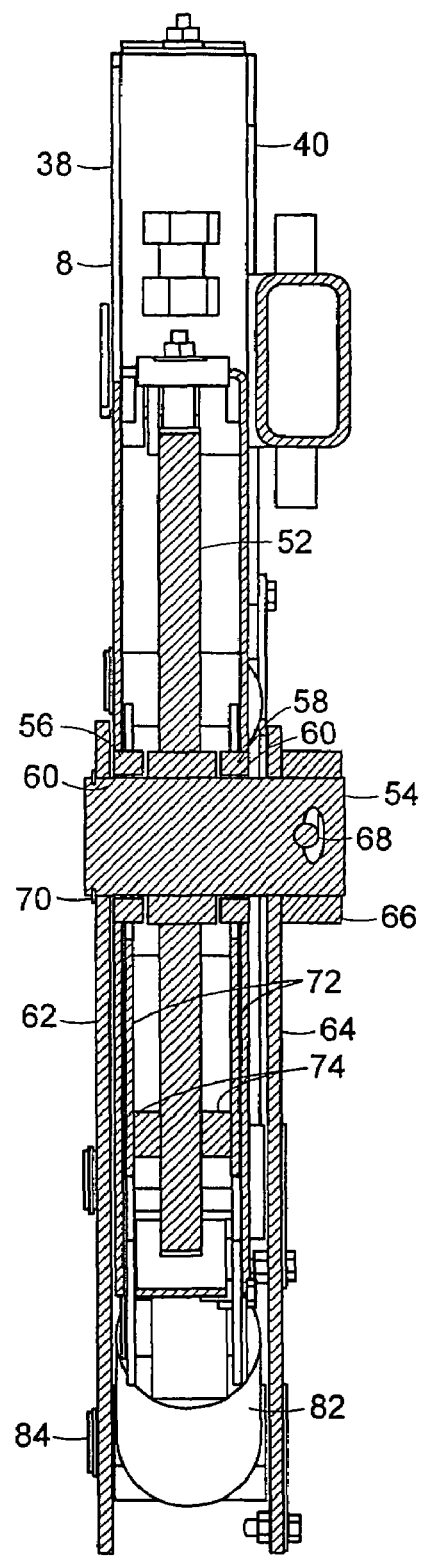
FIG. 4 is a section view of the covering apparatus of FIG. 1, taken along line 4—4 of FIG. 2.

As can be seen in FIGS. 2, 4, first arm member 8 is pivotally mounted at its first end 35 to a first end 51 of mounting member 6 about a pin 54. First sprocket 52 is pivotally secured to first arm member 8 by pin 54 that extends through first sprocket 52. First sprocket 52 is seated between an inner bushing 56 and an outer bushing 58, which are secured to inner wall 38 and outer wall 40, respectively, by welding or other suitable means. Bearings 60 may also be contained within bushings 56, 58 to reduce fiction and wear. Mounting member 6 may be formed of an inner wall 62 and an outer wall 64, which also receive pin 54. A ring 66 surrounds the outer end of pin 54, and is secured to pin 54 by a bolt 68, to prevent pin 54 from rotating and moving axially. A retaining ring 70 at the other end of pin 54 restrains outer wall 64 from moving axially with respect to inner wall 62. Sprocket ears 72 are affixed to each side of first sprocket 52, such as by welding, and may be spaced apart from first sprocket 52 by means of spacers 74. Alternative structures for rigidly connecting first sprocket 52 to sprocket ears 72 are considered to be within the scope of the invention, e.g., by keying pin 54 to first sprocket 52 and welding sprocket ears 72 to pin 54. Other alternative structures will become readily apparent to those skilled in the art, given the benefit of this disclosure.

A first actuator 76 connects mounting member 6 to first arm member 8. A first end of first actuator 76 is pivotally secured to a central portion of mounting member 6 by a pin 78. A second end of first actuator 76 is pivotally secured to second end 37 of first arm member 8 by a pin 80. Although the first actuator 76 of the preferred embodiment is depicted as a hydraulic cylinder, it is understood that rotary actuators or other linear actuators could also be used.

A second actuator 82 connects mounting member 6 to first sprocket 52. A first end of second actuator 82 is pivotally secured by a pin 84 to second end 83 of mounting member 6. Pin 84 extends through second actuator 82, and inner and outer walls 62, 64 of mounting member 6. A pin 85 extends through a second end of second actuator 82 and sprocket ears 72, thereby pivotally securing a second end of second actuator 82 to first sprocket 52. In the illustrated embodiment, second actuator 82 is depicted as a hydraulic cylinder. However, it is understood that rotary actuators or other linear actuators could also be used.

In certain preferred embodiments, a flaccid or linking member such as a continuous loop of chain 86 rotationally links or couples first sprocket 52 and second sprocket 42 to one another. The coupling of second sprocket 42 and first sprocket 52 via chain 86 allows second arm member 10 to pivot or rotate about second end 37 of first arm member 8 well in excess of 180.degree., which allows great freedom of movement of covering apparatus 2. Further, the fact that first arm member 8 and second arm member 10 rotate in planes that are offset from one another allows them to rotate with respect to each other an amount greater than that possible if they were coplanar. In a preferred embodiment, first sprocket 52 is larger than second sprocket 42. Since first sprocket 52 rotates less than 180.degree. in certain preferred embodiments, first sprocket 52 and chain 86 could be replaced with a cable, leaf chain or the like connected to a pulley. Second sprocket 42 and chain 86 in certain other preferred embodiments could be replaced with two cables, leaf chains, or the like, wrapping around a first pulley in opposite directions and affixed to that pulley at their ends, and around a second pulley and affixed to the second pulley at their other ends.

The continuous loop of chain 86 can be regulated by a tensioning device 87 including a cam 88, as seen in FIGS. 2 and 11, over which chain 86 passes. One end of cam 88 is pivotally connected by a pin 90 to first arm member 8. Slack in chain 86 can be regulated by way of an adjustment member such as a bolt 92, which is turned into a nut 94 that is affixed to first arm member 8. Bolt 92 pushes against a second end of cam 88, rotating cam 88 about pin 90. Thus, as bolt 92 is tightened, cam 88 pushes against chain 86, thereby tightening chain 86 and removing excess slack.

As shown in FIGS. 1, 2, a cover 96 may be fastened to first end 35 of first arm member 8 to cover first sprocket 52. Similarly, a cover 98 may be fastened to second end 37 of first arm member 8 to cover second sprocket 42.

Figure 5:
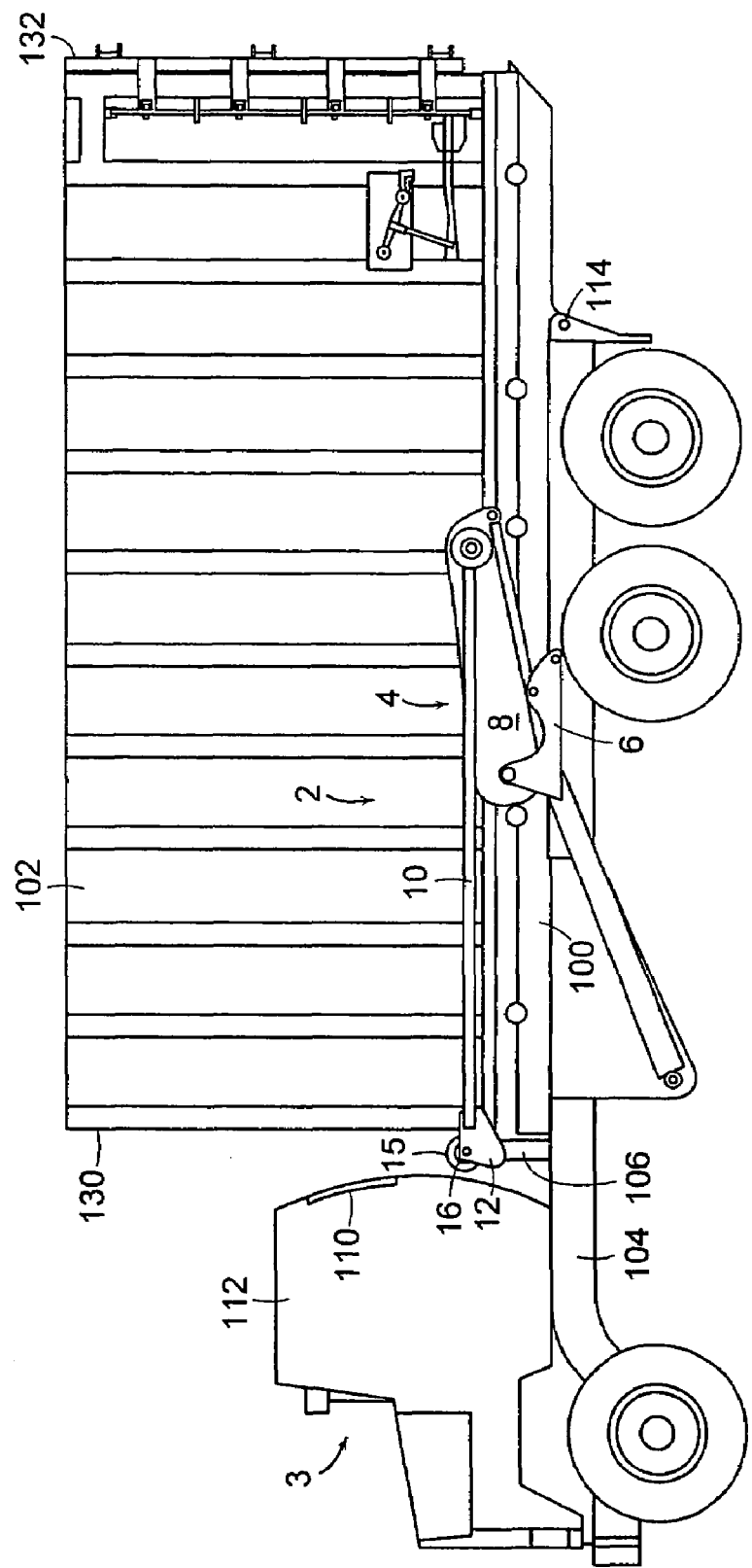
FIG. 5 is a side elevation of the covering apparatus of FIG. 1, shown in its non-deployed condition on a truck with an open top container loaded for transport.

Covering apparatus 2 is seen in FIG. 5 mounted to a tilting platform 100 of truck 3. In the illustrated embodiment, tilting platform 100 allows for loading and unloading of a container 102. Mounting member 6 may be directly mounted to a chassis 104 of truck 3, by bolting, riveting or otherwise suitably fastening a beam structure (not shown) to chassis 104 and mounting member 6. In other preferred embodiments, mounting member 6 may be mounted directly to tilting platform 100 by welding, bolts or any other suitable fastener, in which case covering apparatus 2 will be raised and lowered with tilting platform 100 and container 102.

In FIGS. 2, 5, covering apparatus 2 is shown in its closed, stowed or non-deployed condition. In this condition, second arm member 10 is substantially horizontal to provide a low profile appearance. In such a position, tree limbs and other low hanging objects on a roadway are less likely to damage covering apparatus 2, not only because it is low and substantially horizontal, but also because at this height a driver is more likely avoid potential damage to the covering apparatus 2, since it can be seen in the rear view mirrors and through a rear window 110 of a cab 112 of truck 3.

Spool 16 may be supported in its non-deployed condition on a pedestal 106, as seen in FIG. 5. In such an embodiment, one end of cover 15 may be secured directly to pedestal 106 or to a transverse beam 108, seen in FIG. 7, which extends from pedestal 106. In other embodiments, spool 16 could rest directly on chassis 104 of truck 3, with cover 15 secured to a beam transversely mounted to chassis 104, or directly to chassis 104. When no container 102 is loaded on truck 3, spool 16 rests on pedestal 106 well below the height of rear window 110 of truck 3 so that the driver has a clear view through rear window 110 unencumbered by spool 16 or support pedestal 106. In some cases, particularly when retrofitting a truck, there may not be room between cab 112 and tilting platform 100 to mount spool 16. In such a case, pedestal 106 may be lengthened, and spool 16 mounted in the area above window 110. There is extra room available in that area since tilting platform 100 rotates away from cab 112 about a rear pivot point 114 during dumping. If spool 16 is mounted in a higher position, a stop is inserted in the base ends of first extension actuators 76 to shorten their stroke.

Figure 6:
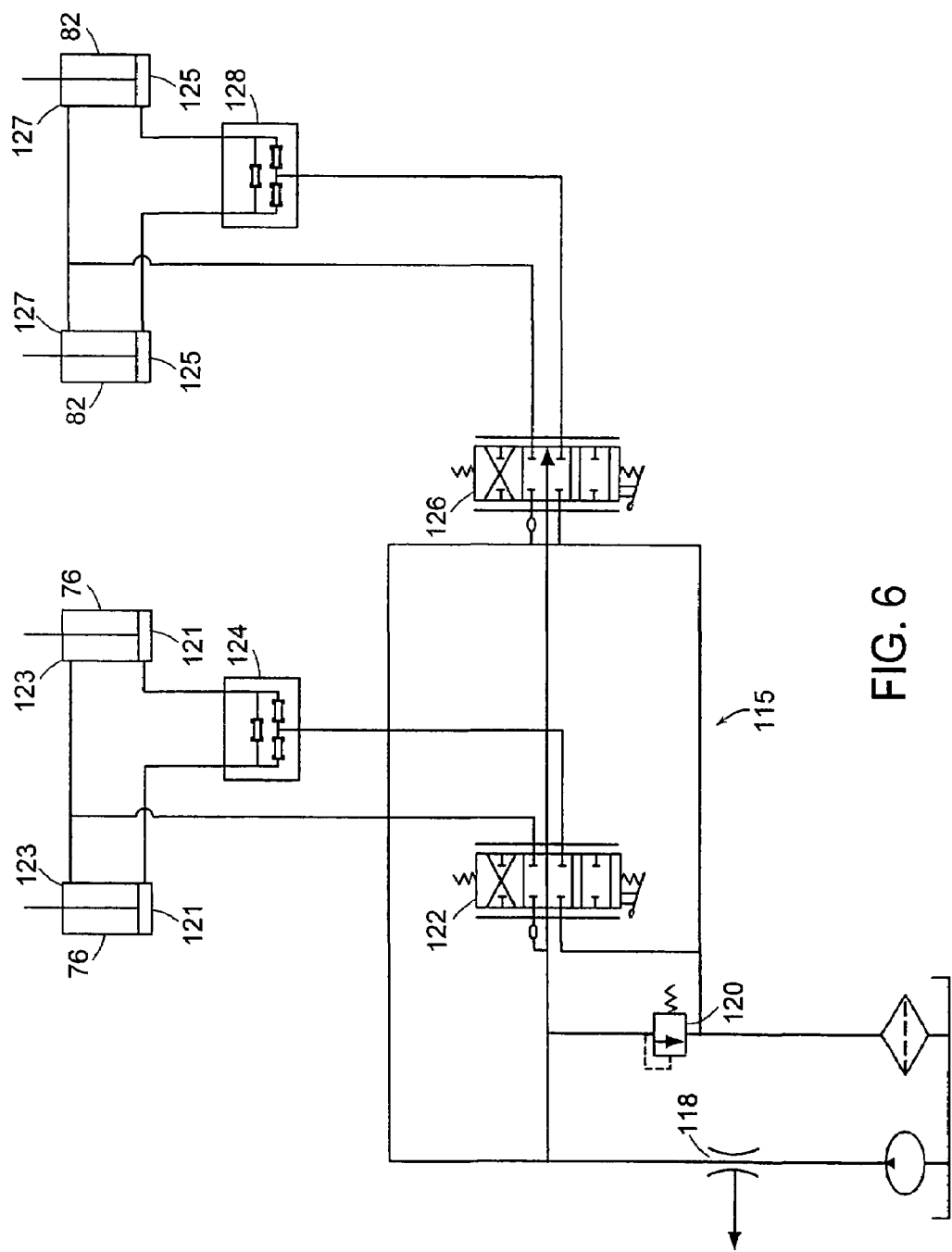
FIG. 6 is a schematic view of a hydraulic circuit for actuation of the covering apparatus of FIG. 1.

In a preferred embodiment, covering apparatus 2 is controlled by a hydraulic system 115, as seen in FIG. 6. A pump 116 provides hydraulic power. Pump 116 can either be driven by the engine of truck 3, or it may be a stand-alone electrically driven pump. If pump 116 is the same pump used to operate the standard hydraulic systems of truck 3, a flow divider 118 may be used to limit the flow to the covering apparatus 2, e.g., to approximately 3–5 gallons per minute. A relief valve 120 limits the maximum pressure provided to first and second actuators 76, 82. A first directional control valve 122 controls the flow of fluid to first actuators 76. When first directional control valve 122 is actuated in one direction, pressurized fluid is introduced to a base end 121 of first actuators 76 in order to extend them. When actuated in the other direction, pressurized fluid is introduced into an opposed rod end 123 of first actuators 76, retracting them. A divider-combiner 124 divides the fluid evenly into each of first actuators 76 to keep them synchronized when they are extending. When first actuators 76 are retracting, divider-combiner 124 combines fluid from first actuators 76 evenly to keep them synchronized. If first actuators 76 should get out of synchronization, divider-combiner 124 will allow some fluid to pass from one side to the other when only one of the first actuators 76 is at the end of its stroke until such time as they are both at the end of their stroke. In a like manner, a second directional control valve 126 controls the flow of fluid to a base end 125 and a rod end 127 of second actuators 82 to correspondingly extend and retract second actuators 82. Another divider-combiner 128 operates, in a like manner as described above with respect to divider-combiner 124, to synchronize second actuators 82.

Figure 7:
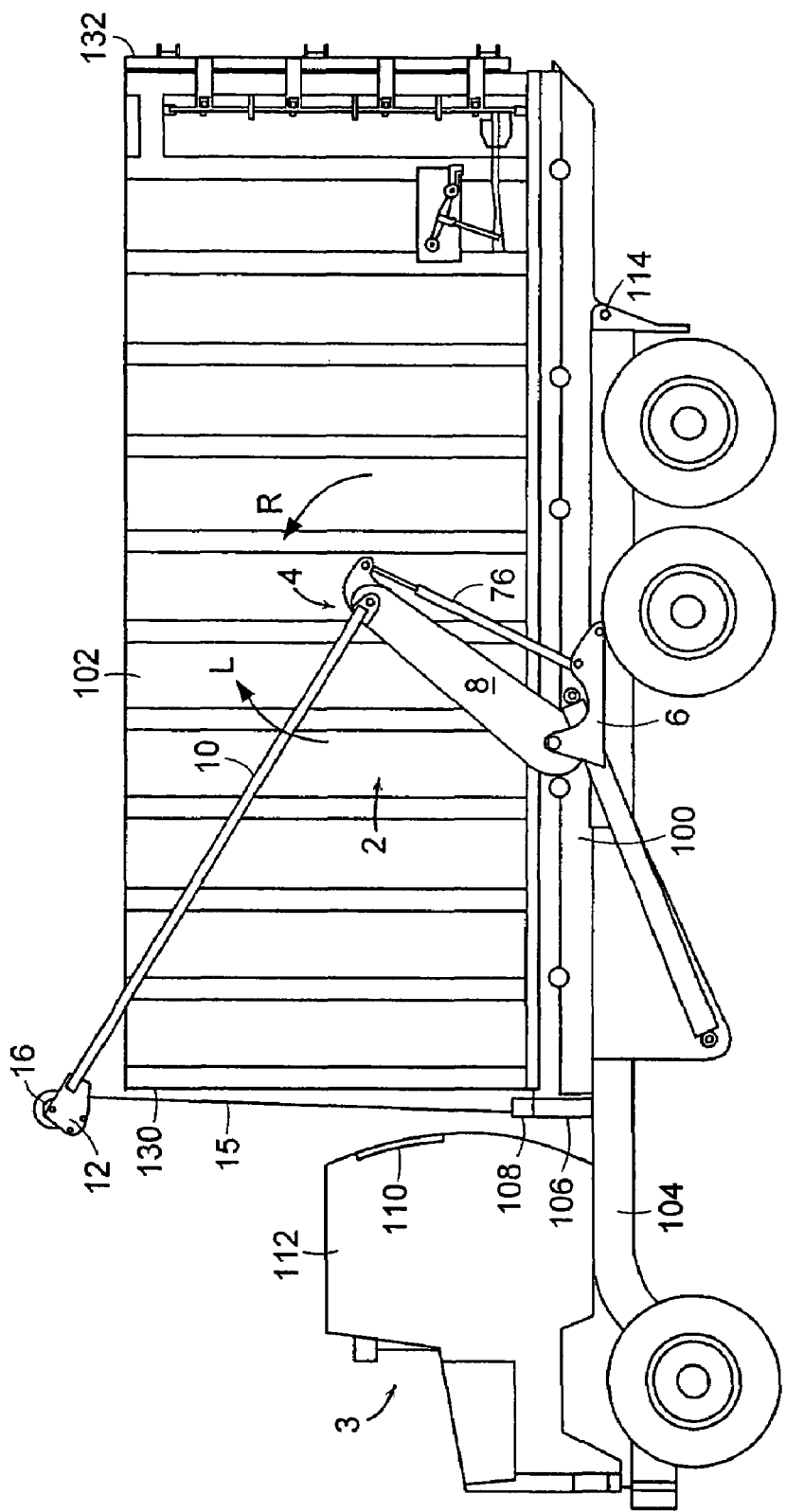
FIG. 7 is a side elevation of the covering apparatus of FIG. 1, shown in the initial phase of covering an open top container.

With open top container 102 on tilting platform 100, as seen in FIG. 7, cover 15 begins to move from its stowed position to its deployed position. An operator initially actuates first directional control valve 122 such that first actuators 76 extend. As first actuators 76 extend, first arm member 8 rotates towards the cab 112, counter clockwise in the direction of arrow R as seen in FIG. 7. Second sprockets 52 do not rotate since they are secured to second actuators 82, so as first arm member 8 rotates, it rotates with respect to first sprocket 52. As first arm member 8 rotates, chain 86 is wrapped onto one side of first sprocket 52 (the bottom side as illustrated in FIG. 2), and off of the other (the top side as seen in FIG. 2). The rotation of first arm member 8 relative to first sprocket 52 and the wrapping and unwrapping of chain 86 about first sprocket 52 causes second sprocket 42 to also be rotated relative to the first arm member 8. The amount of rotation in degrees of second sprocket 42 with respect to first arm member 8 is calculated by multiplying the rotation in degrees of first arm member 8 times the pitch diameter of first sprocket 52 divided by the pitch diameter of second sprocket 42. It may also be calculated by multiplying the rotation in degrees of first arm member 8 times the number of teeth on first sprocket 52 divided by the number of teeth on second sprocket 42. By choosing this ratio appropriately, the path of spool 16 can be made to move almost vertically from its stowed position along a front wall 130 of container 102 to a point at the top front wall 130. This is shown as the path from point A to point B in FIG. 9. The approximate position of covering apparatus 2 after moving vertically along a front wall 130 to a top of container 102 is shown in FIG. 7. Thus, the positioning of spool 16 at the front edge of container 102 is advantageously accomplished without having to jockey two sets of actuators. As spool 16 moves upwardly, cover 15 unwinds from spool 16 so that it extends from beam 108 to the top of container 102 along front wall 130. In a preferred embodiment, cover 15 unwinds from the bottom of spool 16 as it travels.

Figure 8:
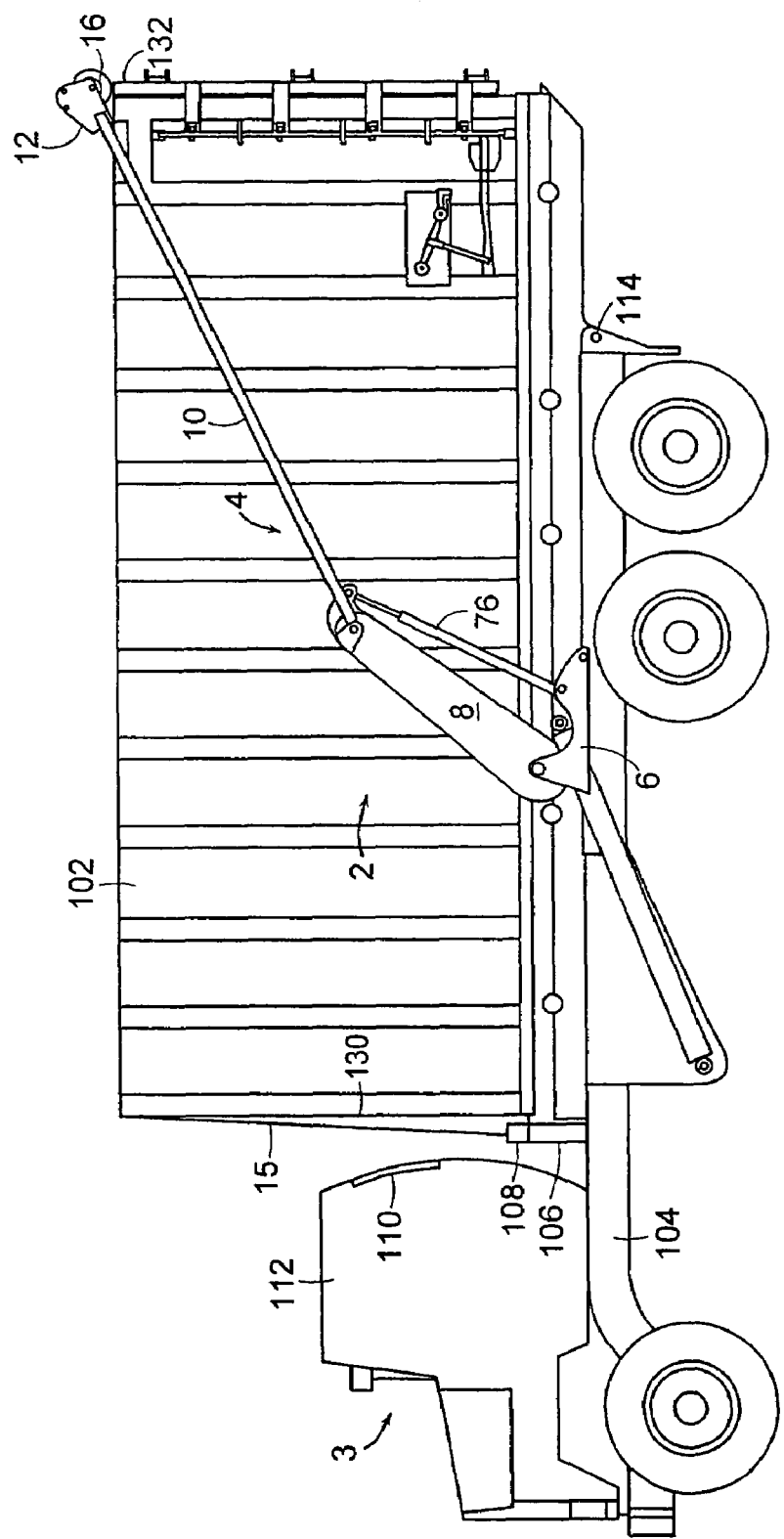
FIG. 8 is a side elevation of the covering apparatus of FIG. 1, shown with its cover of flexible material in place on an open top container.

With spool 16 positioned at the top of front wall 130 as shown in FIG. 7, second directional control valve 126 is then actuated such that second actuators 82 extend. Since second actuators 82 are secured to second sprockets 52 by way of sprocket ears 72, extending second actuators 82 rotates second sprockets 52 clockwise as seen in FIG. 2, which moves chain 86 in a clockwise direction, thereby rotating second sprocket 42 in a clockwise direction. This rotation of second sprocket 42 rotates second arm member 10 clockwise in the direction of arrow L, as seen in FIG. 7, toward the rear of truck 3. Consequently, as second arm member 10 rotates, spool 16 spins and further unwinds cover 15 until spool 16 reaches the rear of container 102 such that cover 15 in its deployed position covers the entire top of container 102, as seen in FIG. 8. In a preferred embodiment, spool 16 rests on the top of container 102 in the deployed position, providing support for arms 4 of covering apparatus 2. The path that spool 16 travels from the front to the rear of container 102 as it deploys cover 15 is shown as path B-C-D in FIG. 9.

In preferred embodiments, first arm member 8 is shorter than second arm member 10 such that when cover 15 is deployed across the top of container 102, the pivotal joint between first arm member 8 and second arm member 10, that is, where pin 44 connects second end 37 of first arm member 8 and first end 11 of second arm member 10, does not extend above the top of container 102, as seen in FIG. 8.

The amount of rotation of second arm member 10 during its travel is dependent on the ratio of the diameter of first sprocket 52 to the diameter of second sprocket 42. Thus, in an embodiment where first sprocket 52 has a diameter twice that of second sprocket 42, for each degree of rotation that second actuator 82 drives sprocket ears 72 and first arm member 8, second arm member 10 moves through two degrees of rotation.

Figure 9:
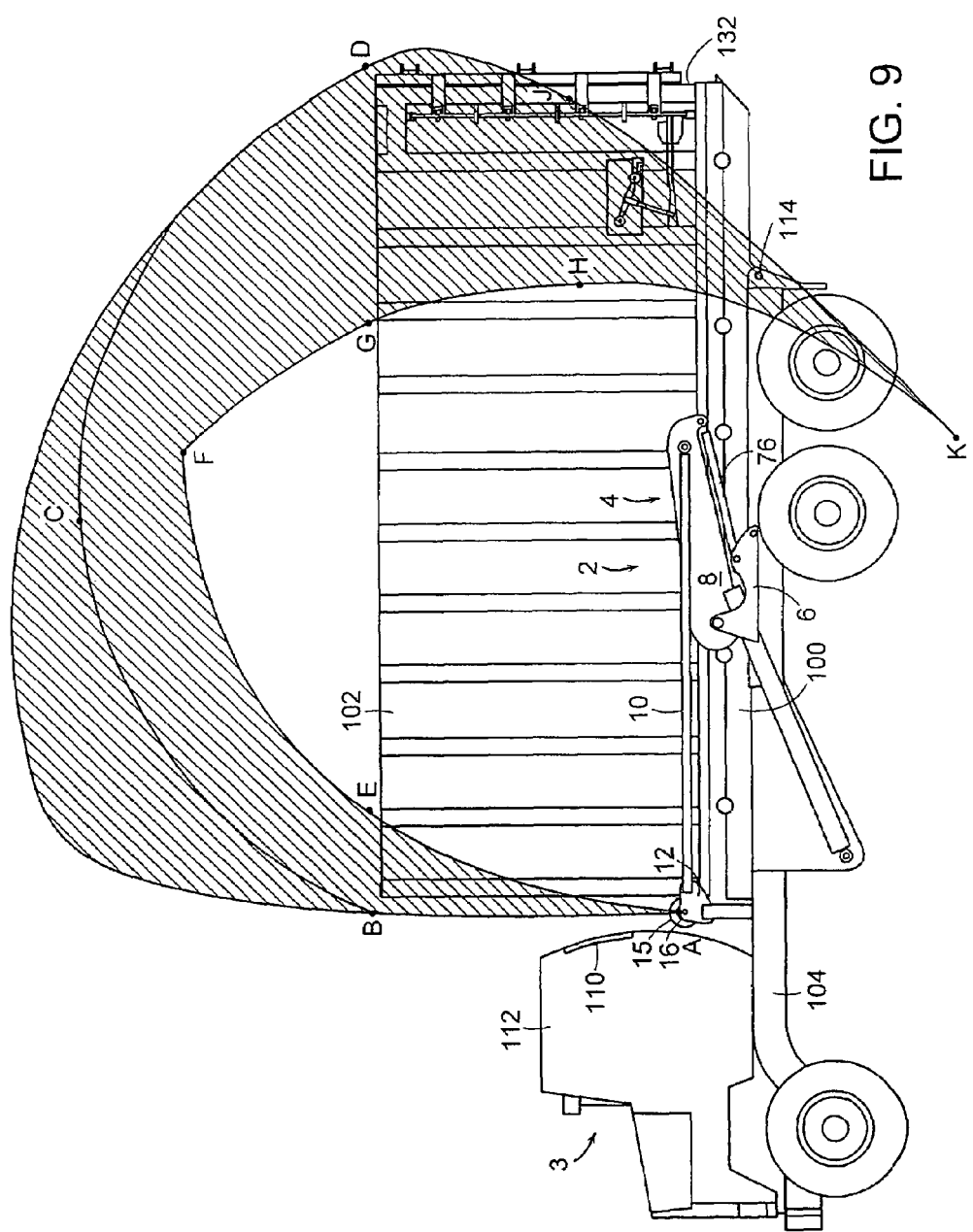
FIG. 9 is a side elevation of the covering apparatus of FIG. 1, showing the envelope where the spool supporting the cover may travel.

Under certain conditions, such as in high winds, an operator can use a different method than that described above to extend cover 15 over container 102, in order to keep cover 15 as low as possible while moving it back over container 102. The operator moves the spool 16 from its stowed condition to the top of front wall 130, that is, from point A to point B as seen in FIG. 9, solely by activating first directional control valve 122 as described above with respect to FIG. 7. Spool 16 is then moved from point B to point E by operating first directional control valve 122 and second directional control valve 126 simultaneously. Spool 16 is then moved from point E to point F by operating only second directional control valve 126, from point F to point G by operating only first directional control valve 122, and from point G to point D by operating first directional control valve 122 and second directional control valve 126 simultaneously.

Figure 10:
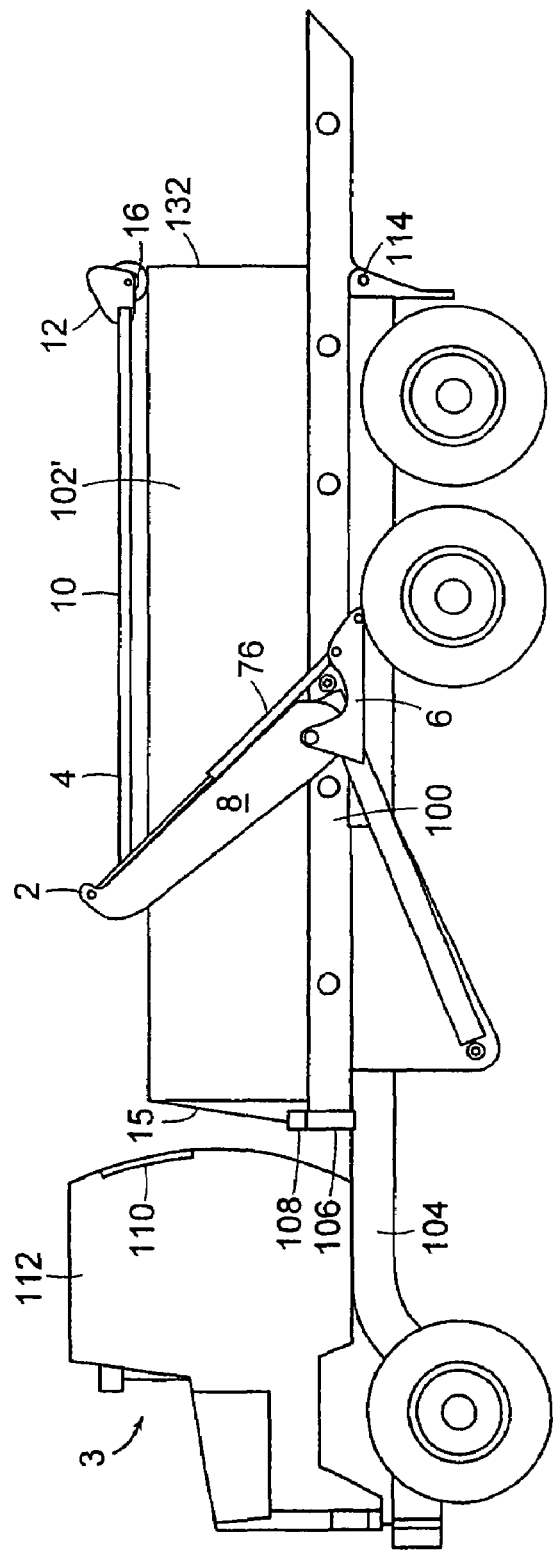
FIG. 10 is a side elevation of the covering apparatus of FIG. 1, shown in a deployed position on a smaller container than that illustrated in FIG. 7.

Spool 16 can be moved along the path from point G to point H to allow shorter containers, e.g., containers approximately 18 feet long, to be covered regardless of their height. The position of the covering apparatus 2 covering a short container 102' is shown in FIG. 10. It is to be appreciated that in certain preferred embodiments, first arm member 8 and second arm member 10 can be shortened as noted above, allowing even shorter containers to be effectively covered by covering apparatus 2. Shortening second arm member 10 and mounting first arm member 8 further forward also allows shorter containers to be covered.

Moving spool 16 along the path from point D to point J allows longer containers, e.g., containers approximately 24 feet long that are typically taller, to be covered. Being able to place the spool 16 anywhere in the area defined by points DJHG in FIG. 9, allows containers between 18 and 24 feet long and most any typical height to be covered. As seen in FIG. 9, the crosshatched area within a path defined by points A-B-D-J-K-H-G-F-E-A shows where spool 16 can travel.

Returning spool 16 and cover 15 to its stowed position is accomplished in one of three ways. The first may be used when an operator desires to keep the cover as close to the container as possible, such as in high winds, and is simply the reverse order of the steps taken to deploy cover 15 in a high wind situation. First and second directional control valves 122, 126 can be operated to follow a path from point D to point G, from point G to point F, from point F to point E, from point E to point B, and from point B to point A.

The second way is to start by rotating first arm member 8 to a forward position with respect to truck 3. On certain containers, first arm member 8 will be in this position already. Second directional control valve 126 is then actuated to retract second actuators 82 until they come fully to the end of their strokes. This will move spool 16 to a forward position above front wall 130 of container 102. First directional control valve 122 is then actuated to retract first actuators 76, which rotates first arm member 8 toward the rear of truck 3. The linked motion of first arm member 8 and second arm member 10, as previously described, causes spool 16 to follow an almost vertical path down between cab 112 of truck 3 and front wall 130 of container 102 until the first and second actuators 76, 82 are fully retracted and have synchronized and spool 16 is resting on pedestal 106.

The third way of returning spool 16 to its stowed position can be used if there is no container 102 on the truck 3. In this situation, both first directional control valve 122 and second directional control valve 126 are actuated, either individually or simultaneously, until each of first and second actuators 76, 82 are fully retracted. Spool 16 will thus simply move to its stowed position on pedestal 106.

Preferred embodiments of the present invention have the ability to cover a wide variety of container sizes as shown in FIGS. 8–10, without hanging spool 16 past the top of rear wall 132 of container 102. In addition, the rotation of first arm member 8 creates the effect of pivoting second arm member 10 from different places fore and aft along the side of container 102 to accommodate different container lengths.

Figure 12:
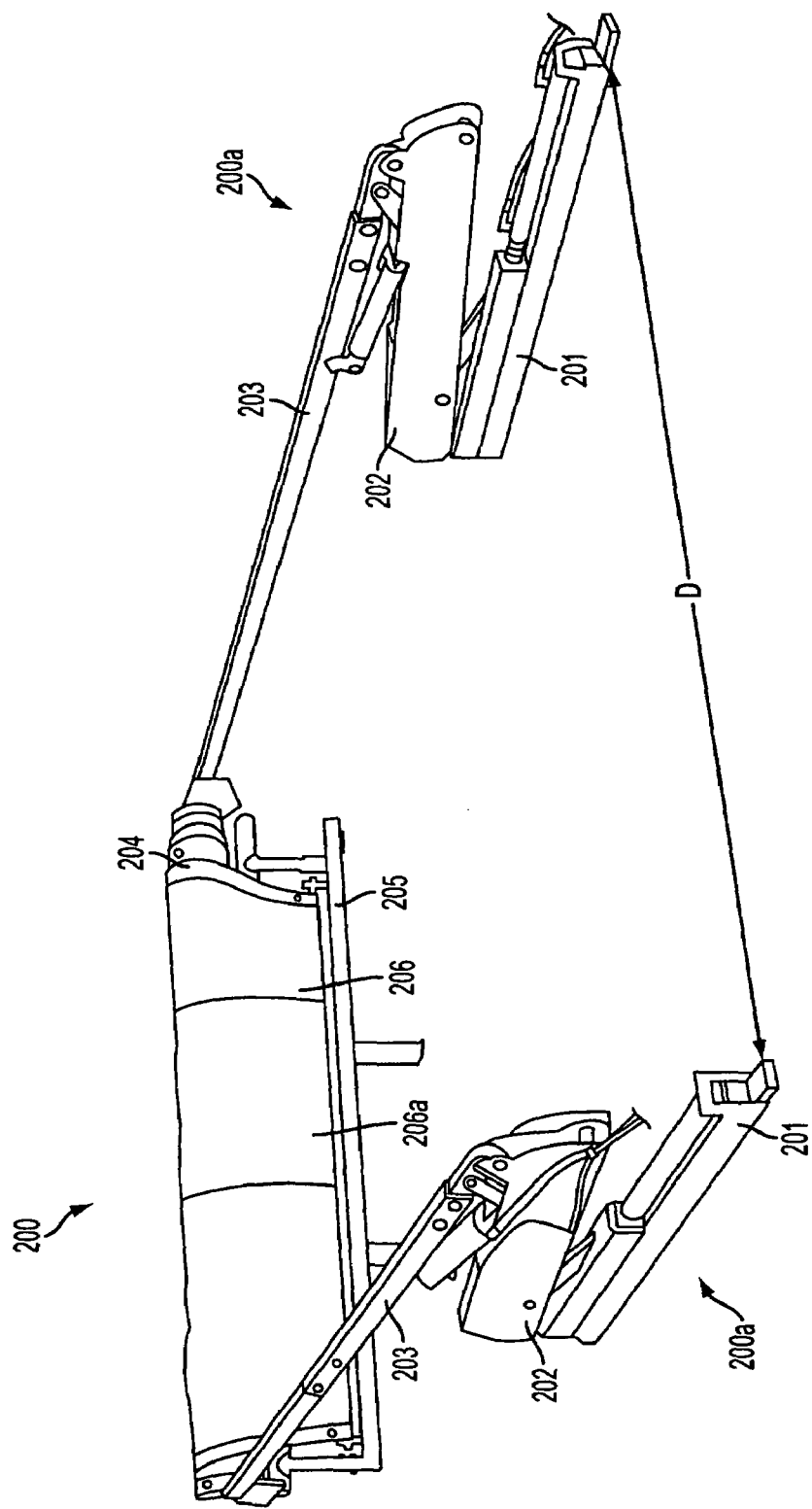
FIG. 12 is a perspective view of another embodiment of a covering apparatus.

Referring now to FIGS. 12–15, a covering apparatus 200 is shown according to further embodiments of the invention. Covering apparatus 200 generally includes aspects and preferences of the embodiments shown in FIGS. 1–11 except as discussed hereafter. Covering apparatus 200 is adapted to be attached to a vehicle, such as the bed or frame of a truck adapted to haul open-top containers. As shown in FIG. 12, covering apparatus 200 includes a pair of actuating assemblies 200*a* that are secured to a vehicle and interconnected by a cover device 206. The actuating assemblies 200*a* are laterally spaced apart a distance D to accommodate the positioning of a container between them on the vehicle. Each actuating assembly 200*a* preferably includes a base 201, a first arm 202 movably attached to the base 201, a second arm 203 movably attached to the first arm 202, a linkage assembly 200*b*, and drivers 209, 230. As discussed further below, the linkage assembly creates a scissor mechanism with first and second arms 202 and 203, so that the first and second arms are rotated simultaneously using a single drive mechanism 209 to initially lift cover device 206 in a substantially vertical movement until it exceeds the height of the container to be covered.

Actuating assemblies 200*a* are preferably the same, although they could differ from other. For example, one could be a driving assembly while the other is a following assembly. For ease of discussion, only one actuating assembly will be discussed with the understanding that the two actuating assemblies are the same.

Figure 13:
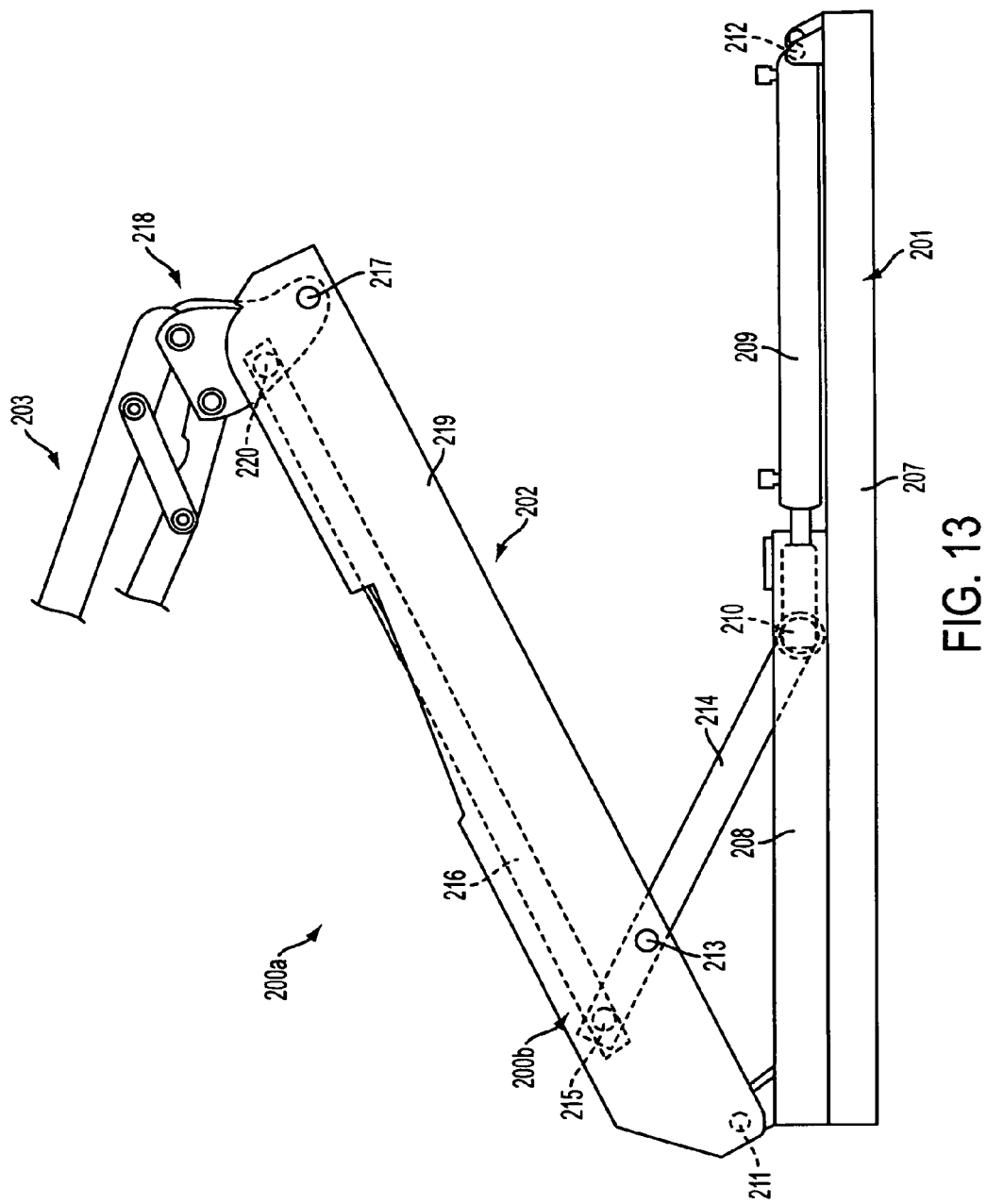
FIG. 13 is a partial side elevation of the covering apparatus of FIG. 12.

In one preferred embodiment, base 201 includes a base beam 207 fixed to the frame or bed of a truck and forming a foundation for the covering system (FIG. 13). A driver 209 is pivotally attached at connection 212 to a one end of base beam 207. The driver is preferably a hydraulic cylinder but could have other constructions such as a pneumatic cylinder, a motor driven screw, etc. The hydraulic cylinder 209 is pivotally attached at an opposite end to one or more track wheels 210. Track wheel 210 translates linearly within a track 208 also fixed to the base beam. First arm 202 is pivotally attached at 211 to a distal end of track 208, though it could be fixed directly to the base beam. The track preferably has a generally U-shaped configuration with an upwardly opening cut out (not shown), although other track configurations could be used. Track wheel 210 moves linearly along track 208 with the operation of driver 209.

A first linkage 214 extends through the cut out to pivotally attach at one end to track wheel 210. Accordingly, the first end of first linkage 214 is moved horizontally when hydraulic cylinder 209 is operated. First linkage 214 also pivotally attaches to first arm 202 at an intermediate connection 213, and via connection 215 to second linkage 216 at its second end. As such, first linkage 214 acts as a lever that transfers motion and force applied to track wheel 210 at its first end to the second linkage 216 via its second end connection 215. Second linkage 216 is pivotally attached to an upper mechanism 218 of the second arm 203 at connection 220. The upper mechanism 218 is also pivotally attached to first arm 202 at connection 217.

Figure 14:
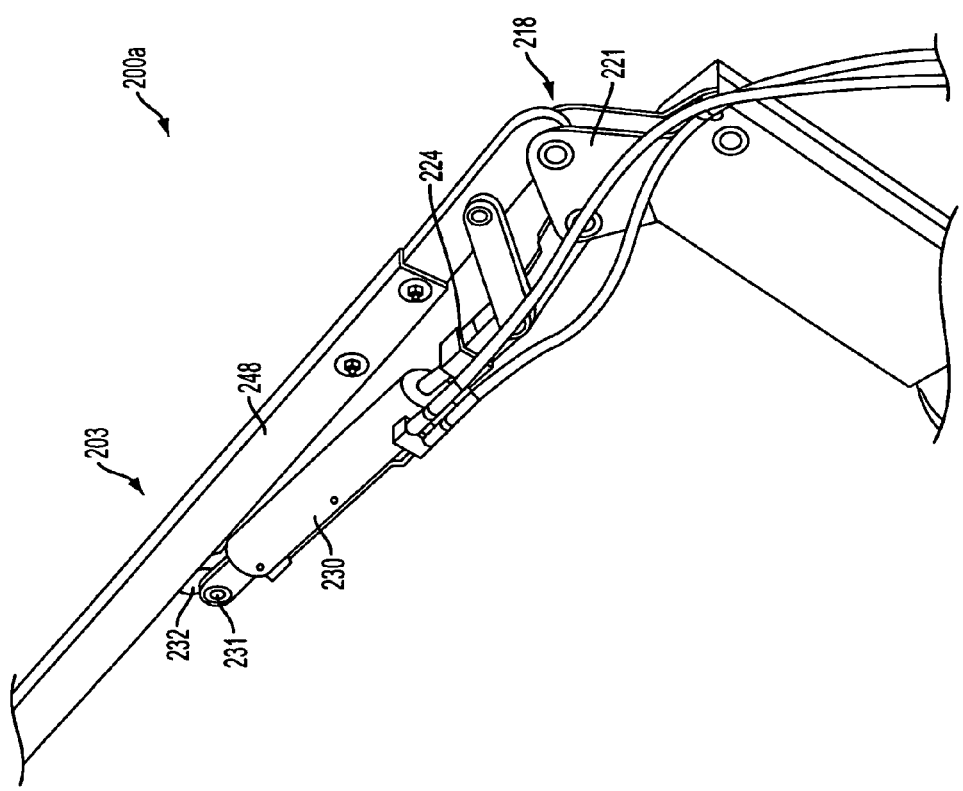
FIG. 14 is a partial perspective view of an upper actuator and an upper arm of the covering apparatus of FIG. 12
Figure 15:
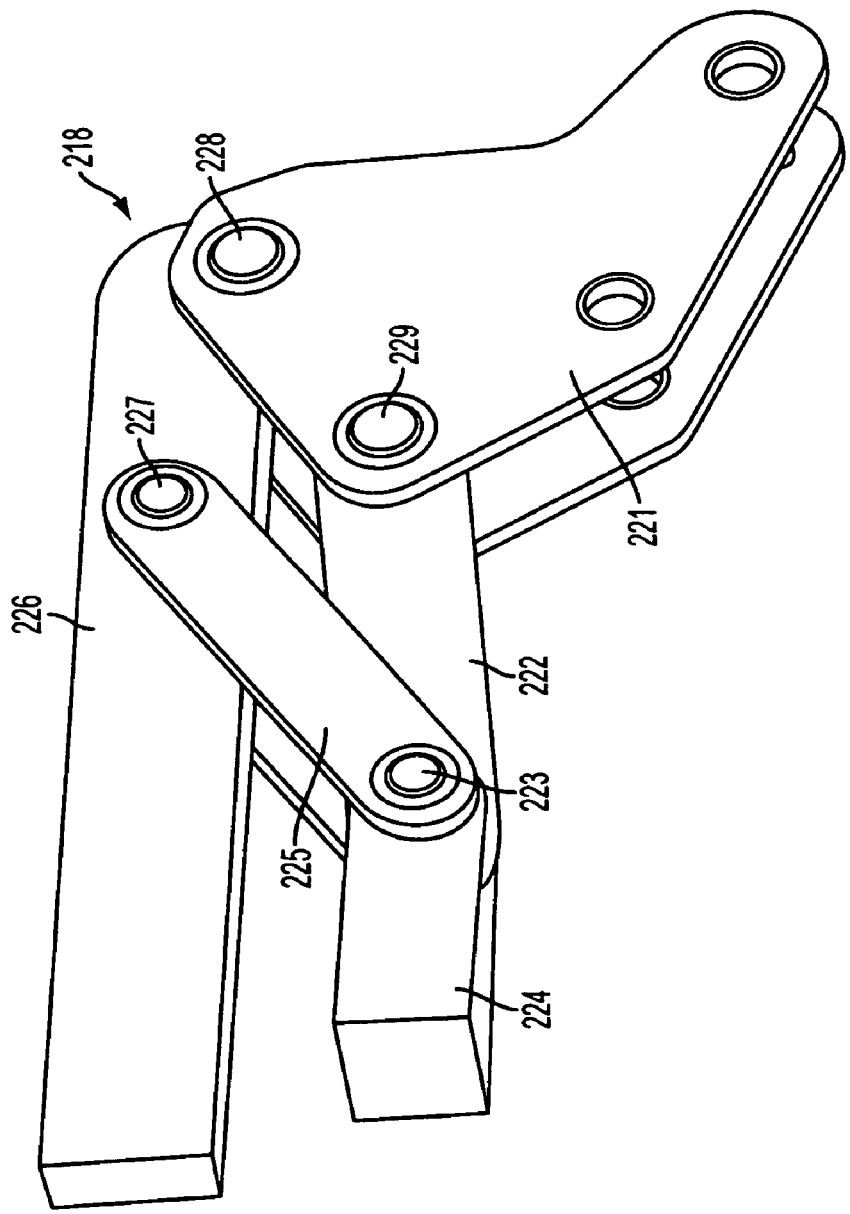
FIG. 15 is a partial perspective view of an upper mechanism of the covering apparatus of FIG. 12.

Second arm 203 preferably includes an upper driver (e.g., hydraulic cylinder) 230, a cylinder bracket 232, upper mechanism 218, and an arm member 248 (FIGS. 14 and 15). Upper mechanism 218 enables the cover to be raised vertically and, in cooperation with driver 230, drawn over the container as second arm 203 is rotated relative to first arm 202. Arm member 248 is preferably fixed to an upper arm bracket 226, which in turn, is pivotally attached to upper mechanism 218, though arm member 248 could be extended to attach directly to upper mechanism 218. The upper hydraulic cylinder 230 is an actuator that drives the rotation of arm member 248 about upper mechanism 218. The second arm is preferably longer than first arm 202 in order to accommodate containers of various lengths. Although this system is intended to be fully operations with arms of fixed lengths, second arm member 248 could have an adjustable, telescoping construction for additional variation if desired. Upper hydraulic cylinder 230 is pivotally attached to upper mechanism 218 at one end and to cylinder bracket 231 at its opposite end.

As shown in FIG. 15, upper mechanism 218 includes a third linkage 221, a fourth linkage 222, a fifth linkage 225, a hydraulic cylinder end 224, and upper arm bracket 226. The third linkage 221 is a bracket that permits the transfer of movement and/or forces from attached components to other components. Third linkage 221 is pivotally attached to fourth linkage 222 at connection 223, and to second arm bracket 226 at connection 228. Third linkage 221 also pivotally connects to second linkage 216 at connection 220, and to second arm 202 at connection 217 (see FIG. 13). Thus, third linkage 221 can transfer movement and/or forces from second linkage 216 to second arm base 226, from fourth linkage 216 to second arm base 226, and combinations thereof. Fifth linkage 225 is pivotally attached to fourth linkage 222 at connection 225 and to upper arm bracket 226 at connection 227. The hydraulic cylinder end 224 is rigidly attached at a distal end to hydraulic cylinder 230 (see FIG. 14) and is pivotally attached to both fourth linkage 222 and to fifth linkage 225.

As shown in FIG. 12, the free end of each second arm 203 is attached to the cover device 206. In the preferred construction, second arms 203 are each attached to one end of a roller 204 supporting a cover 206a. Roller 204 is pretensioned with an internal spring in a conventional manner, but could have other known constructions. Alternatively, roller 204 could be secured to the truck and a lead rod (not shown) extended between second arms 203. The lead rod is fixed to a leading end of cover 206a to pull (or retract) the cover over the container. As previously discussed with other embodiments, cover 206a is formed of a flexible material such as polyester, polypropylene, vinyl, canvas, or other material suitable for retaining material within a container. When the covering apparatus is in the stowed position, roller 204 rests on gantry 205 supported by the truck.

Figure 16:
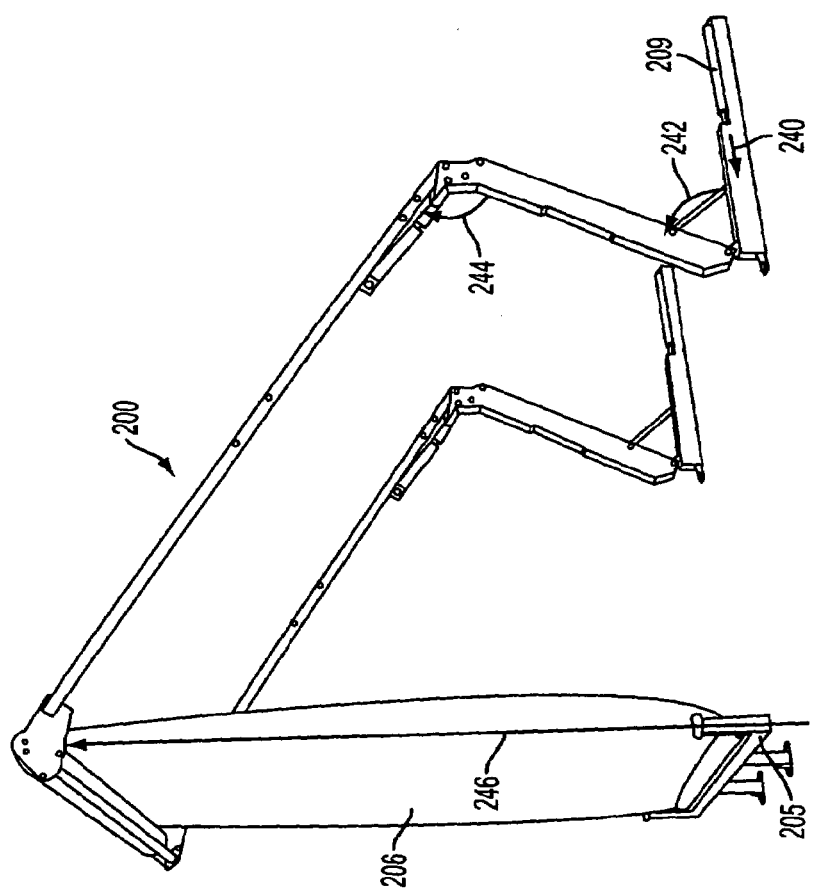
FIG. 16 is a perspective view of the covering apparatus of FIG. 12, showing the substantially vertical path of the cover as the apparatus is being raised.

As illustrated in FIG. 16 along with the components shown in FIG. 13, first linkage 214, second linkage 216, upper mechanism 218 and first arm 202 together form a scissor mechanism for raising the cover device 206 in the substantially vertical path 246 of FIG. 16. The dimensions of the first linkage, the second linkage, the upper mechanism and their pivot points are determined such that when hydraulic cylinder 209 actuates first linkage 214, the first linkage actuates the second arm member via upper mechanism 218 to raise roller 204 in a substantially vertical path. In the illustration of FIG. 16 and referring to components labeled in FIG. 13, hydraulic cylinder 209 drives a first end of the first linkage in linear direction 240. Due the pivoting connection between first arm 202 with base 201, and the pivoting connection between first linkage 214 and first arm 202, the action of driving the first end of first linkage 214 in linear direction 240 effectuates rotation of first arm 202 in an arc 242. Via its lever action, first linkage 214 also drives second linkage 216 to apply a force to upper mechanism 218 of second arm 203. Due to its pivoting connection with first arm 202, such a force applied to the upper mechanism causes second arm 203 to rotate in an arc 244, which is opposite in direction to arc 242, to provide a scissor-type action. As such, roll 204 with cover 206a is raised from a first position on gantry 205 along a substantially vertical path 246 via the application of linear force from hydraulic cylinder 209 to linkage 214 to a raised position.

The scissor configuration of covering apparatus 200 and the vertical motion thereof provides a variety of benefits. It permits roller 204 to be raised in the vertical space between the cab of the truck and its container while reducing the possibility of damage to truck cab or to the roller itself. Since the roller has the ability of moving between the truck cab and container without contacting them, the roller can be positioned close to the truck frame without obscuring the driver's rear view.

Figure 17:
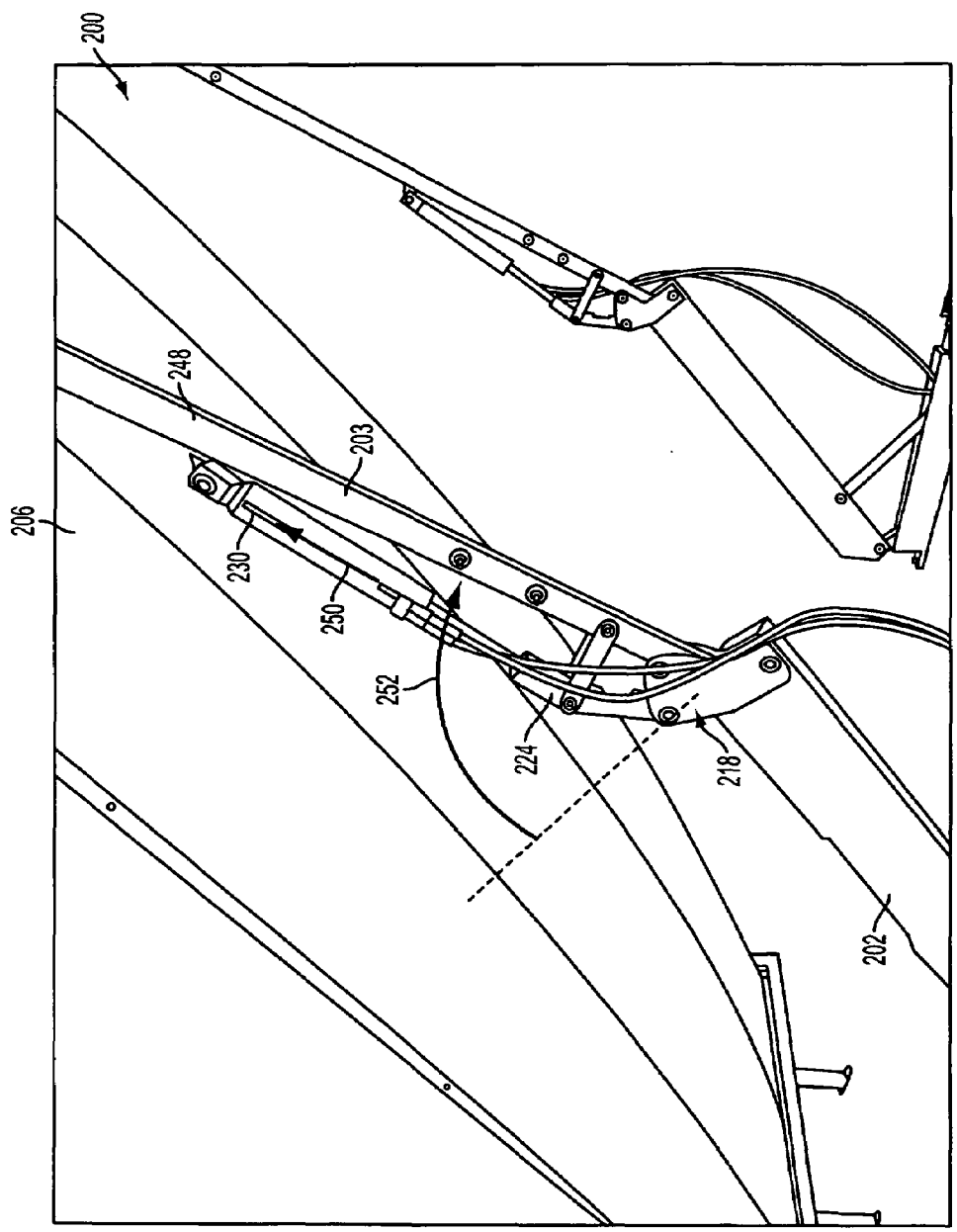
FIG. 17 is a partial perspective view of the covering apparatus of FIG. 12, showing the upper arm at an intermediate position as the cover is being extended.
Figure 18:
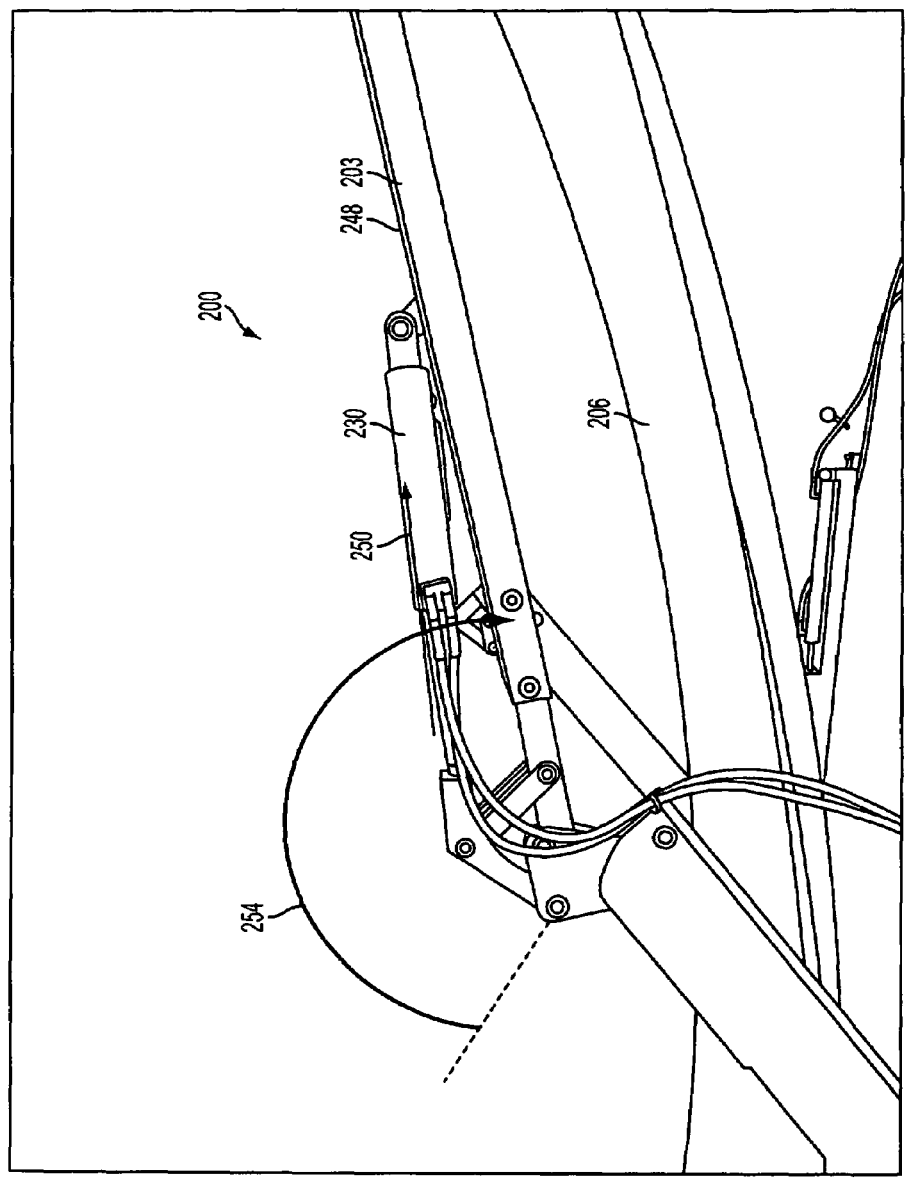
FIG. 18 is a partial perspective view of the covering apparatus of FIG. 12, showing the upper arm at an extended, covered position.

Upper mechanism 218 and upper hydraulic cylinder 230 provide rotational motion for second arm member 248 for covering (or opening) an open container with cover 206a. FIGS. 16–18 illustrate rotational movement of second arm 203 for covering the container. FIG. 16 shows second arm 203 in a first covering position after it has been vertically raised from a storage position. As shown in FIG. 17, upon actuation of hydraulic cylinder 230 in linear direction 250, arm member 248 rotates along arc 252 due to its connection with upper mechanism 218. As shown in FIG. 18, continued actuation of hydraulic cylinder 230 results in arm member 248 rotating along arc 254 to an extended position. Cover 206 is deployed from roll 204 as the roll is correspondingly rotated along arc 254 for covering the top of the container.

The scissor configuration of pivotally mounted linkages 214 and 216, are preferably nested within an outer shell construction 219 of first arm 202, which reduces the possibility of damage to the linkages, such as from external forces. The nested configuration further permits first and second arms 202 and 203 to fold together into a narrow, compact storage position having a relatively small profile. The scissor configuration of covering apparatus 200 further permits easy access to the linkages and the pivot mechanisms for routine or field maintenance thereof, or to replace the linkages if needed. Further, it provides a relatively inexpensive mechanism for rotating both first and second arms 202 and 203 using force applied from a single drive mechanism, such as hydraulic cylinder 209. Application of force to first linkage 214 from hydraulic cylinder 209 directly moves first arm 202 and causes second arm 203 to be passively moved by the motion and forces transferred via second linkage 216 to upper mechanism 218.

As with previous embodiments, covering apparatus 200 provides a flexible system that can accommodate containers of various shapes and sizes, as well as adapt to various situations and conditions, such as windy conditions. By actuating hydraulic cylinders 209 and 230 in various directions, amounts and combinations, roll 204 can be moved along a variety of paths. This is because first and second arm members 202 and 203 have two degrees of freedom, which permit them to position the roller bar/roll 204 at any point within their motion range. Therefore, the roller bar/roll can be positioned as desired to cover an open container or to place it on the truck frame. Such flexibility in operation can prevent excessive wear or damage to covering apparatus 200 by permitting it to be controlled only as needed or to place it in a storage position on the truck. This can avoid dynamic stresses induced on the roller and on the arms from operational vibration of the truck outside of the storage position.

Figure 19:
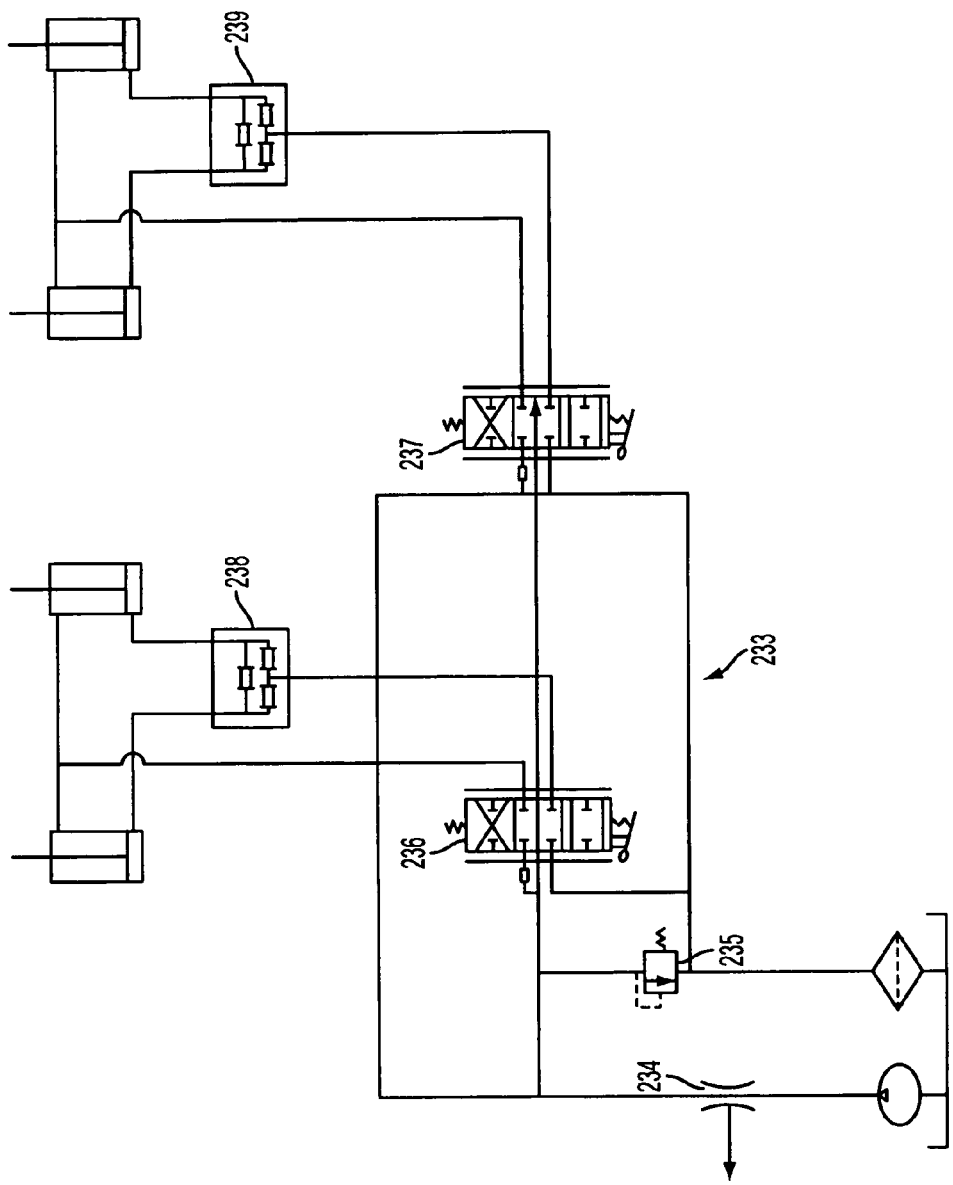
FIG. 19 is a schematic view of a hydraulic circuit for actuation of the covering apparatus of FIG. 12.

Referring now to FIG. 19, a hydraulic system 233 is shown for controlling covering apparatus 200. The hydraulic system is driven by a pump (not shown), such as one driven by truck engine or by a stand-alone electrically driven pump. A flow divider (not shown) may be used to limit hydraulic flow to the covering apparatus as needed, such as to a rate of approximately 3–5 gallons per minute. A relief valve limits the maximum pressure provided to lower and upper hydraulic cylinders 209 and 230. A first directional control valve 236 controls the flow of fluid to lower hydraulic cylinders 209. A divider-combiner 238 divides the fluid evenly into each of lower hydraulic cylinders 209 to keep them synchronized when they are extending, or it combines fluid from them evenly to keep them synchronized. Another divider-combiner 239 operates, in a like manner as described above with respect to divider-combiner 238, to synchronize upper hydraulic cylinders 230.

Covering apparatus 200 can be controlled by actuating lower and upper cylinders 209 and 230 using hydraulic system 233. Hydraulic system 233 could be controlled using two hydraulic control levers (not shown) at a single location. As discussed above, lower and upper cylinders 209 and 230 can be controlled in various combinations to place roll 204 in a wide variety of positions within the range of motion of the covering apparatus.

While the invention has been described with respect to specific examples including presently preferred modes of carrying out the invention, those skilled in the art will appreciate that there are numerous variations and permutations of the above-described systems and techniques that fall within the spirit and scope of the invention as set forth in the appended claims.

What is claimed is:

1. An apparatus for covering an open container of a vehicle, the apparatus comprising:
   a cover movable between an extended position in which the cover overlies the container and a stowed position in which the container is open;
   an arm assembly coupled to the cover to move the cover between the extended and the stowed positions, the arm assembly including a first arm and a second arm movably coupled together, the first arm being adapted for attachment to a vehicle and the second arm being attached to the cover;
   a first actuator coupled to the first arm for moving the first arm relative to the vehicle; and
   a linking assembly coupled to the first and second arms to passively move the second arm when the first arm is moved by the first actuator.

2. The apparatus of claim 1, wherein one said first arm, one said second arm, one said first actuator and one said linking assembly are provided to each side of the container.

3. The apparatus of claim 1, wherein the linking assembly passively moves the second arm at a predetermined rate upon movement of the first arm by the first actuator so that the cover moves upward along a substantially vertical plane as the first arm is moved by the actuator.

4. The apparatus of claim 1, wherein the first and second arms rotate in a substantially vertical plane as the first arm is moved by the first actuator.

5. The apparatus of claim 1, further comprising a support base attached to the first arm and adapted to be affixed to the vehicle.

6. The apparatus of claim 1, wherein the first actuator comprises a linear drive member for providing a linear driving force for moving the first arm.

7. The apparatus of claim 1, wherein the linking assembly comprises a first linkage pivotally connected to the first actuator and to the first arm.

8. The apparatus of claim 7, wherein the first linkage is pivotally connected to the first arm at an intermediate point.

9. The apparatus of claim 8, wherein the linking assembly further comprises a second linkage pivotally connected to the first linkage and to the second arm, the second linkage driving the second arm when the first actuator drives the first arm.

10. The apparatus of claim 9, further comprising a second actuator for moving the second arm relative to the first arm.

11. The apparatus of claim 9, wherein the second arm includes an upper mechanism comprising:
    a bracket member;
    a coupling between the bracket member and the second linkage; and
    a pivot connecting the first arm to the bracket member;
    wherein the bracket member is permitted to rotate about the pivot upon movement of the second rigid linkage.

12. The apparatus of claim 11, wherein the second arm comprises a second actuator and an arm member connected to the cover, the upper mechanism further comprising:
    a pivot connecting the arm member to the bracket member; and
    a coupling between a first end of the second actuator and the upper mechanism;
    wherein a second end of the second actuator is connected to the arm member for permitting rotation of the arm member about the upper mechanism.

13. The apparatus of claim 12, wherein the coupling between the first end of the second actuator and the upper mechanism includes a third linkage and the second arm further comprising a fourth linkage extending between the first end of the second actuator and the arm member.

14. The apparatus of claim 1, wherein the first arm is rotatable in a vertical plane with respect to the second arm, and the second arm is independently rotatable in a vertical plane with respect to the first arm, such that the apparatus has at least two degrees of freedom for moving the cover.

15. The apparatus of claim 1, wherein the linking assembly comprises a first sprocket fixed to the second arm, a second sprocket, and a chain wrapped about each of the sprockets.

16. A method for covering an open top container supported by a vehicle, the method comprising:
- providing a cover attached between ends of pivoted arm structures, one of the pivoted arm structures being provided to each side of the container;
- actuating a first actuator to drive a first arm of the pivoted arm structures;
- driving a second arm of the pivoted arm structures via movement of the first arm; and
- raising the cover substantially vertically from a stowed position to a covering position.

17. The method of claim 16, further comprising actuating a second actuator to move the second arm holding the cover to a rear end of the container so that the cover overlies an open top of the container.

18. The method of claim 16 wherein the first actuator includes a linear actuator, wherein the step of raising is driven by operating only the linear actuator for each arm assembly.

19. An apparatus for covering an open container of a truck, the apparatus comprising:
- a cover movable between an extended position in which the cover overlies the container and a stowed position in which the container is open;
- a first arm assembly at the left side of the container and coupled to the cover to move the cover between the extended and the stowed positions, the arm assembly including a first arm and a second arm movably coupled together, the second arm being attached to the cover;
- a second arm assembly at the right side of the container and coupled to the cover to move the cover between the extended and the stowed positions, the arm assembly including a third arm and a fourth arm movably coupled together, the fourth arm being attached to the cover;
- a first actuator coupled to the first arm for moving the first arm relative to the truck;
- a second actuator coupled to the third arm for moving the third arm relative to the first arm;
- a first linking assembly coupled to the first and second arms to passively move the second arm when the first arm is moved by the first actuator; and
- a second linking assembly coupled to the third and fourth arms to passively move the fourth arm when the third arm is moved by the second actuator.

20. The apparatus of claim 19, further comprising:
- a third actuator for moving the second arm relative to the first arm; and
- a fourth actuator for moving the third arm relative to the third arm.

* * * * *